(12) United States Patent
Van der Auwera et al.

(10) Patent No.: US 9,560,383 B2
(45) Date of Patent: Jan. 31, 2017

(54) INTRA PULSE CODE MODULATION (IPCM) AND LOSSLESS CODING MODE DEBLOCKING FOR VIDEO CODING

(71) Applicant: QUALCOMM Incorporated, San Diego, CA (US)

(72) Inventors: Geert Van der Auwera, San Diego, CA (US); Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/927,150

(22) Filed: Oct. 29, 2015

(65) Prior Publication Data

US 2016/0050443 A1   Feb. 18, 2016

Related U.S. Application Data

(62) Division of application No. 13/655,009, filed on Oct. 18, 2012.

(Continued)

(51) Int. Cl.
H04N 19/86 (2014.01)
H04N 19/117 (2014.01)

(Continued)

(52) U.S. Cl.
CPC ............ *H04N 19/86* (2014.11); *H04N 19/117* (2014.11); *H04N 19/12* (2014.11); *H04N 19/157* (2014.11);

(Continued)

(58) Field of Classification Search
CPC ...... H04N 19/86; H04N 19/117; H04N 19/12; H04N 19/157; H04N 19/176; H04N 19/182; H04N 19/61; H04N 19/70; H04N 19/82
See application file for complete search history.

(56) References Cited

U.S. PATENT DOCUMENTS 7,439,880 B2  10/2008  Seki et al.
8,165,411 B2  4/2012  Park et al.
(Continued)

FOREIGN PATENT DOCUMENTS

CN  101106718 A  1/2008
JP  2006020355 A  1/2006
(Continued)

OTHER PUBLICATIONS

Chono, "Proposal of Enhanced PCM coding in HEVC," Joint Collaborative Team on Video Coding (JCT-VC) of ITU-T SG16 WP3 and ISO/IEC JTC1/SC29/WG11, Document JCTVC-E192-r2, Geneva, CH, Mar. 2011.*

(Continued)

*Primary Examiner* — Thai Tran
*Assistant Examiner* — Christopher T Braniff
(74) *Attorney, Agent, or Firm* — Shumaker & Sieffert, P.A.

(57) ABSTRACT

Techniques for coding video data include coding a plurality of blocks of video data, wherein at least one block of the plurality of blocks of video data is coded using a coding mode that is one of an intra pulse code modulation (IPCM) coding mode and a lossless coding mode. In some examples, the lossless coding mode may use prediction. The techniques further include assigning a non-zero quantization parameter (QP) value for the at least one block coded using the coding mode. The techniques also include performing deblocking filtering on one or more of the plurality of blocks of video (Continued)

data based on the coding mode used to code the at least one block and the assigned non-zero QP value for the at least one block.

42 Claims, 11 Drawing Sheets

Related U.S. Application Data

(60) Provisional application No. 61/549,597, filed on Oct. 20, 2011, provisional application No. 61/605,705, filed on Mar. 1, 2012, provisional application No. 61/606,277, filed on Mar. 2, 2012, provisional application No. 61/624,901, filed on Apr. 16, 2012, provisional application No. 61/641,775, filed on May 2, 2012.

(51) Int. Cl.
*H04N 19/82* (2014.01)
*H04N 19/176* (2014.01)
*H04N 19/70* (2014.01)
*H04N 19/157* (2014.01)
*H04N 19/182* (2014.01)
*H04N 19/12* (2014.01)
*H04N 19/61* (2014.01)

(52) U.S. Cl.
CPC .......... *H04N 19/176* (2014.11); *H04N 19/182* (2014.11); *H04N 19/61* (2014.11); *H04N 19/70* (2014.11); *H04N 19/82* (2014.11)

(56) References Cited

U.S. PATENT DOCUMENTS

| | | | |
|---|---|---|---|
| 8,606,028 B2 | 12/2013 | Noda et al. | |
| 8,660,375 B2 | 2/2014 | Lim et al. | |
| 8,787,467 B2 | 7/2014 | Lim et al. | |
| 2005/0243911 A1 | 11/2005 | Kwon et al. | |
| 2008/0089597 A1 | 4/2008 | Guo et al. | |
| 2008/0170627 A1 | 7/2008 | Yamada et al. | |
| 2008/0219354 A1 | 9/2008 | Segall et al. | |
| 2009/0154557 A1* | 6/2009 | Zhao ............... | H04N 19/176 375/240.03 |
| 2009/0161761 A1 | 6/2009 | Ramachandran et al. | |
| 2009/0213930 A1 | 8/2009 | Ye et al. | |
| 2009/0245664 A1 | 10/2009 | Matsumoto et al. | |
| 2009/0263032 A1 | 10/2009 | Tanaka et al. | |
| 2010/0322317 A1 | 12/2010 | Yoshimatsu et al. | |
| 2011/0080957 A1 | 4/2011 | Pan et al. | |
| 2011/0222597 A1 | 9/2011 | Xu et al. | |
| 2011/0222790 A1 | 9/2011 | Zhang et al. | |
| 2012/0082243 A1 | 4/2012 | Baylon et al. | |
| 2013/0022112 A1* | 1/2013 | Lim ............... | H04N 19/0009 375/240.12 |
| 2013/0101025 A1 | 4/2013 | Van Der Auwera et al. | |

FOREIGN PATENT DOCUMENTS

| | | | |
|---|---|---|---|
| JP | 2007158430 A | 6/2007 | |
| KR | 20080033813 A | 4/2008 | |
| RU | 2008138706 A | 4/2010 | |
| RU | 2013104978 A | 10/2014 | |
| WO | 2008057308 A2 | 5/2008 | |
| WO | 2013011659 A1 | 1/2013 | |

OTHER PUBLICATIONS

Auwera et al., "AHG6: Deblocking of IPCM Blocks Containing Reconstructed Samples," JCT-VC Meeting—MPEG Meeting; Feb. 1, 2012-Feb. 10, 2012; San Jose CA; (Joint Collaborative Team on Video Coding of ITU-T SG.16 WP3 and ISO/IEC JTC1/SC29/WG11); No. JCTVC-H0448, XP030051849, 6 pp.
Auwera et al., "Deblocking of IPCM Blocks Containing Reconstructed Samples," JCT-VC Meeting—MPEG Meeting; Nov. 21, 2011-Nov. 30, 2011; Geneva, CH; (Joint Collaborative Team on Video Coding of ITU-T SG.16 WP3 and ISO/IEC JTC1/SC29/WG11); URL: http://wftp3.itu.int/av-arch/jctvc-site/ No. JCTVC-3138, XP030110122, 5 pp.
Bross et al., "High Efficiency Video Coding (HEVC) text specification draft 10 (for FDIS & Last Call)," Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pages.
Bross et al., "High Efficiency Video Coding (HEVC) text specification draft 7," JCT-VC Meeting; MPEG Meeting; Apr. 27, 2012-May 7, 2012; Geneva, CH; (Joint Collaborative Team on Video Coding of ITU-T SG.16 WP3 and ISO/IEC JTC1/SC29/WG11); URL: http://wftp3.itu.int/av-arch/jctvc-site/, No. JCTVC-I1003_d0, KP030112373, 270 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "WD4: Working Draft 4 of High-Efficiency Video Coding," JCT-VC of ITU-T SG16 WP3 and ISO/IEC JTC1/SC29/WG11, JCTVC-F803_d6, 6th Meeting, Torino, IT, Jul. 14-22, 2011, 229 Pages.
Bross et al., "WD4: Working Draft 4 of High-Efficiency Video Coding," 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16) ; URL: http://wftp3.itu.int/av-arch/jctvc-site/, No. JCTVC-F803, Sep. 8, 2011 (Sep. 8, 2011), pp. 1-216, XP030009800.
Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 259 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pages.
Bross et al., "WD4: Working Draft 4 of High-Efficiency Video Coding," 6th Meeting: JCTVC-F803_d0, Torino, IT, Oct. 4, 2011, 216 pp.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross et al., "WD5: Working Draft 5 of High-Efficiency Video Coding," 7th Meeting: Geneva, CH, Nov. 21-30, 2011, JCTVC-G1103_d2, 214 pp.
Chono K. et al., "Proposal of enhanced PCM coding in HEVC," Joint Collaborative Team on Video Coding (JCT-VC) of ITU-T SG16 WP3 and ISO/IEC JTC1/SC29/WG11, JCTVC-E192-r2, 5th Meeting, Geneva, CH, Mar. 16-23, 2011, pp. 1-12.
Chono Keiichi et al.,"Proposal of enhanced PCM coding in HEVC," 96. MPEG Meeting; Mar. 21, 2011-Mar. 25, 2011; Geneva; (Motion Picture Expert Group or ISO/IEC JTC1/SC29/WG11) No. m19710, Mar. 21, 2011 (Mar. 21, 2011), XP030048277.
Grois D. et al. "Efficient Real-Time Video-in-Video Insertion into a Pre-Encoded Video Stream," Source: http://www.isrn.com/journals/sp/2011/975462/, See Abstract and Sections 2, 2.1, 2.5 & 2.6.2.
International Preliminary Report on Patentability—PCT/US2012/061072, The International Bureau of WIPO—Geneva, CH, Feb. 13, 2014.

(56) References Cited

OTHER PUBLICATIONS

International Search Report and Written Opinion—PCT/US2012/061072—ISA/EPO—Jan. 16, 2013, 15 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
Okubo S, "Impress STandard Textbook Series—3rd Revision of H.264/AVC Textbook," 1st Edition, Impress R&D, Jan. 1, 2009, pp. 144-148, ISBN: 978-4-8443-2664-9.
Second Written Opinion from International Application No. PCT/US2012/061072, dated Nov. 12, 2013, 11 pp.
Sun: "Lossless Coding and QP Range Selection," 3. JVT Meeting; 60. MPEG Meeting; May 6, 2002-May 10, 2002; Fairfax,US; (Joint Video Team of ISO/IEC JTC1/SC29/WG11 and ITU-T SG.16 ) No. JVT-0023r1-L, May 10, 2002, pp. 1-6, XP030005129, ISSN: 0000-0442.
Sun S., "Lossless Coding and QP Range Selection," JVC of ISO/IEC MPEG & ITU-T VCEG, ISO/IEC JCT1/SC29/WG11 and ITU-T SG16 Q.6, JVT-C023r1, 3rd Meeting, Fairfax, Virginia, May 6-10, 2002, pp. 1-6.
Wang L.L. et al., "Improved lossless coding algorithm in H.264/AVC based on hierarchical intraprediction and coding-mode selection," Journal of Electronic Imaging, vol. 20 (4), 043001 (Oct.-Dec. 2011), pp. 043001-1 to 043001-10.
Wiegand et al., "WD1: Working Draft 1 of High-Efficiency Video Coding," JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Aoki, et al., "CE4 Subtest 2: Spatial QP prediction: combination of test 2.3.g, 2.3.f and 2.3.e," Joint Collaboration Team, ITU-T SG16 WP3 and ISO/IEC JTC1/SC29/WG11, Jul. 14-22, 2011, Document: JCTVC-F661, 10 pp.
Zhou, "AHG22: High-level signaling of lossless coding mode in HEVC," Joint Collaborative Team on Video Coding (JCT-VC) of ITU-T SG16 WP3 and ISO/IEC JTC1/SC29/WG11, Nov. 19-30, 2011; Document: JCTVC-G092 (version2), Nov. 24, 2011, 10 pp.
Chuang et al: "AhG Quantization: Sub-LCU Delta QP," Mar. 7, 2011, No. JCTVC-E051, Mar. 7, 2011, XP030008557, ISSN: 0000-0007, 6 pp.

\* cited by examiner

INTRA PULSE CODE MODULATION (IPCM) AND LOSSLESS CODING MODE DEBLOCKING FOR VIDEO CODING

This application is a divisional application of U.S. patent application Ser. No. 13/655,009, entitled "INTRA PULSE CODE MODULATION (IPCM) AND LOSSLESS CODING MODE DEBLOCKING FOR VIDEO CODING," filed on Oct. 18, 2012, which claims the benefit of U.S. Provisional Application No. 61/549,597, filed Oct. 20, 2011, U.S. Provisional Application No. 61/605,705, filed Mar. 1, 2012, U.S. Provisional Application No. 61/606,277, filed Mar. 2, 2012, U.S. Provisional Application No. 61/624,901, filed Apr. 16, 2012, and U.S. Provisional Application No. 61/641,775, filed May 2, 2012, the entire contents of each of which are incorporated herein by reference.

TECHNICAL FIELD

This disclosure relates to video coding, and, more particularly, to coding blocks of video data generated by video coding processes.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients. Entropy coding may then be applied to achieve even more compression.

SUMMARY

In general, this disclosure describes techniques for performing deblocking filtering relative to blocks of video data coded using intra pulse code modulation (IPCM) coding and/or lossless coding modes. In particular, the techniques of this disclosure may include performing deblocking filtering on one or more blocks of video data that include one or more IPCM coded blocks, losslessly coded blocks, and blocks coded using lossy coding techniques, or "modes." The techniques described herein may improve visual quality of one or more of the blocks of video data when the blocks are coded, compared to other techniques.

Specifically, the described techniques may improve visual quality of one or more of the IPCM coded blocks that include reconstructed video data by enabling deblocking filtering for the blocks and performing the deblocking filtering in a particular manner. Additionally, the techniques may improve visual quality of one or more of the losslessly coded blocks that include original video data by disabling deblocking filtering for the blocks. Furthermore, the techniques also may improve visual quality of one or more of the blocks coded using the lossy coding modes, e.g., blocks located adjacent to one or more of the IPCM and losslessly coded blocks, by performing deblocking filtering on the blocks in a particular manner. As a result, there may be a relative improvement in visual quality of one or more blocks of video data including blocks coded using IPCM, lossless, and lossy coding modes, when using the techniques of this disclosure.

In one example of the disclosure, a method of coding video data includes coding a plurality of blocks of video data, wherein at least one block of the plurality of blocks of video data is coded using a coding mode that comprises one of an IPCM coding mode and a lossless coding mode that uses prediction, assigning a non-zero quantization parameter (QP) value for the at least one block coded using the coding mode, and performing deblocking filtering on one or more of the plurality of blocks of video data based on the coding mode used to code the at least one block and the assigned non-zero QP value for the at least one block.

In another example of the disclosure, an apparatus configured to code video data includes a video coder. In this example, the video coder is configured to code a plurality of blocks of video data, wherein the video coder is configured to code at least one block of the plurality of blocks of video data using a coding mode that comprises one of an IPCM coding mode and a lossless coding mode that uses prediction, assign a non-zero QP value for the at least one block coded using the coding mode, and perform deblocking filtering on one or more of the plurality of blocks of video data based on the coding mode used to code the at least one block and the assigned non-zero QP value for the at least one block.

In another example of the disclosure, a device configured to code video data includes means for coding a plurality of blocks of video data, including means for coding at least one block of the plurality of blocks of video data using a coding mode that comprises one of an IPCM coding mode and a lossless coding mode that uses prediction, means for assigning a non-zero QP value for the at least one block coded using the coding mode, and means for performing deblocking filtering on one or more of the plurality of blocks of video data based on the coding mode used to code the at least one block and the assigned non-zero QP value for the at least one block.

The techniques described in this disclosure may be implemented in hardware, software, firmware, or combinations thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable medium and loaded and executed in the processor.

Accordingly, in another example, this disclosure contemplates a computer-readable storage medium storing instructions that, when executed, cause one or more processors to code video data. In this example, the instructions cause the one or more processors to code a plurality of blocks of video data, including coding at least one block of the plurality of blocks of video data using a coding mode that comprises one of an IPCM coding mode and a lossless coding mode that uses prediction, assign a non-zero QP value for the at least one block coded using the coding mode, and perform deblocking filtering on one or more of the plurality of blocks of video data based on the coding mode used to code the at least one block and the assigned non-zero QP value for the at least one block.

The details of one or more examples are set forth in the accompanying drawings and the description below. Other features, objects, and advantages will be apparent from the description and drawings, and from the claims.

DETAILED DESCRIPTION

In general, this disclosure describes techniques for performing deblocking filtering relative to blocks of video data coded using intra pulse code modulation (IPCM) coding and/or lossless coding modes. In particular, the techniques of this disclosure may include performing deblocking filtering on one or more blocks of video data that include one or more IPCM coded blocks, losslessly coded blocks, and blocks coded using so-called "lossy" coding techniques, or "modes." The techniques described herein may improve visual quality of one or more of the blocks of video data when the blocks are coded, compared to other techniques.

As one example, the described techniques may improve visual quality of one or more IPCM coded blocks that include reconstructed video data by enabling deblocking filtering for the blocks and performing the deblocking filtering in a particular manner. For example, the techniques include assigning a non-zero quantization parameter (QP) value for an IPCM coded block based on one or more of a signaled QP value that indicates the assigned non-zero QP value, a predicted QP value, and a delta QP ("dQP") value that represents a difference between the assigned non-zero QP value and the predicted QP value, for the IPCM coded block. The techniques further include performing deblocking filtering on the IPCM coded block based on the assigned non-zero QP value for the IPCM coded block.

As another example, the described techniques may improve visual quality of one or more losslessly coded blocks that include original video data by disabling deblocking filtering for the blocks. For example, the techniques include signaling one or more syntax elements (e.g., 1-bit codes, or "flags") that indicate that deblocking filtering is disabled for one or more losslessly coded blocks. In some examples, the one or more syntax elements may indicate that the deblocking filtering is disabled for all boundaries of the one or more losslessly coded blocks that are shared with other, adjacent blocks of video data.

As yet another example, the described techniques also may improve visual quality of one or more blocks of video data that are located adjacent to an IPCM coded block or a losslessly coded block, and that are coded using lossy coding modes, by performing deblocking filtering on the lossy blocks in a particular manner. For example, the techniques include performing the deblocking filtering on the one or more lossy blocks based on an assigned non-zero QP value for the adjacent IPCM or losslessly coded block.

In this manner, there may be a relative improvement in visual quality of one or more blocks of video data including blocks coded using IPCM, lossless, and lossy coding modes, when using the techniques of this disclosure.

Figure 1:
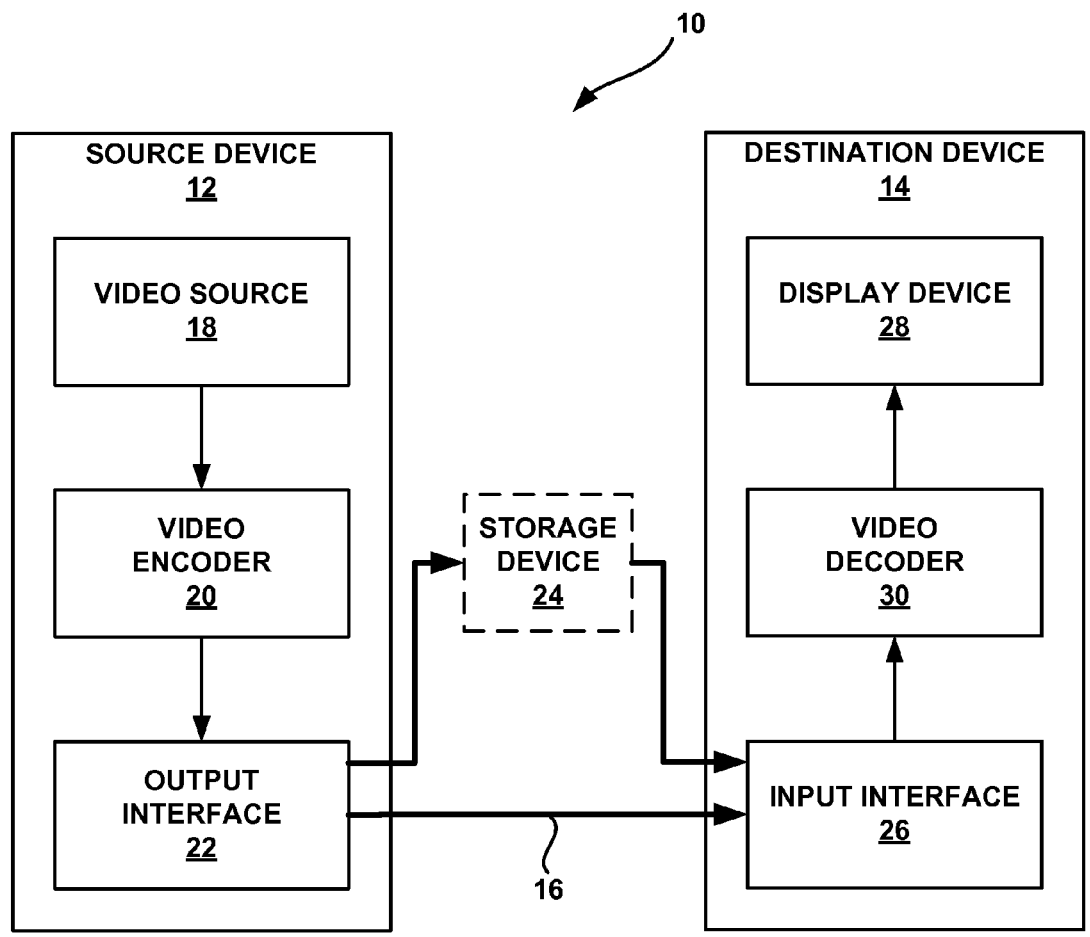
FIG. 1 is a block diagram that illustrates an example of a video encoding and decoding system that may perform techniques for intra pulse code modulation (IPCM) and lossless coding mode deblocking, consistent with the techniques of this disclosure.

FIG. 1 is a block diagram that illustrates an example of a video encoding and decoding system that may perform techniques for IPCM and lossless coding mode deblocking, consistent with the techniques of this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 24. Similarly, encoded data may be accessed from storage device 24 by input interface 26. Storage device 24 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 24 may correspond to a file server or another intermediate storage device that may hold the encoded video generated by source device 12. Destination device 14 may access stored video data from storage device 24 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 24 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 24 for later access by destination device 14 or other devices, for decoding and/or playback.

Destination device 14 includes an input interface 26, a video decoder 30, and a display device 28. In some cases, input interface 26 may include a receiver and/or a modem. Input interface 26 of destination device 14 receives the encoded video data over link 16 or from storage device 24. The encoded video data communicated over link 16, or provided on storage device 24, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 28 may be integrated with, or be external to, destination device 14. In some examples, destination device 14 may include an integrated display device and also be configured to interface with an external display device. In other examples, destination device 14 may be a display device. In general, display device 28 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development by the Joint Collaborative Team on Video Coding (JCT-VC) of ITU-T Video Coding Experts Group (VCEG) and ISO/IEC Motion Picture Experts Group (MPEG), and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263. A recent draft of the HEVC standard, referred to as "HEVC Working Draft 8" or "WD8," is described in document JCTVC-J1003_d7, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 Jul. 2012, which, as of Oct. 2, 2012, is downloadable from http://phenix.int-evry.fr/jct/doc_end_user/documents/10_Stockholm/wg11/JCTVC-J1003-v8.zip.

Another draft of the HEVC standard, referred to in this disclosure as "HEVC Working Draft 4" or "WD4," is described in document JCTVC-F803_d2, Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, IT, 14-22 Jul. 2011, which, as of Oct. 2, 2012, is downloadable from http://phenix.int-evry.fr/jct/doc_end_user/documents/6_Torino/wg11/JCTVC-F803-v8.zip. Another draft of the HEVC standard, referred to in this disclosure as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 1, 2012, is downloadable from http://phenix.int-evry.fr/jct/doc_end_user/documents/8_San%20Jose/wg11/JCTVC-H1003-v22.zip.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder ("CODEC") in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block," or simply "block," to refer to a coding node of a CU. In some specific cases, this disclosure may also use the term "video block" to refer to a treeblock. i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scanning, or "scan" order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding, or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether or not neighboring values of the symbol are zero-valued. To perform CAVLC, video encoder 20 may select a variable length code for a symbol to be transmitted. Codewords in VLC may be constructed such that relatively shorter codes correspond to more probable symbols, while relatively longer codes correspond to less probable symbols. In this manner, the use of VLC may achieve a bit savings over, for example, using equal-length codewords for each symbol to be transmitted. The probability determination may be based on a context assigned to the symbol.

Figure 2:
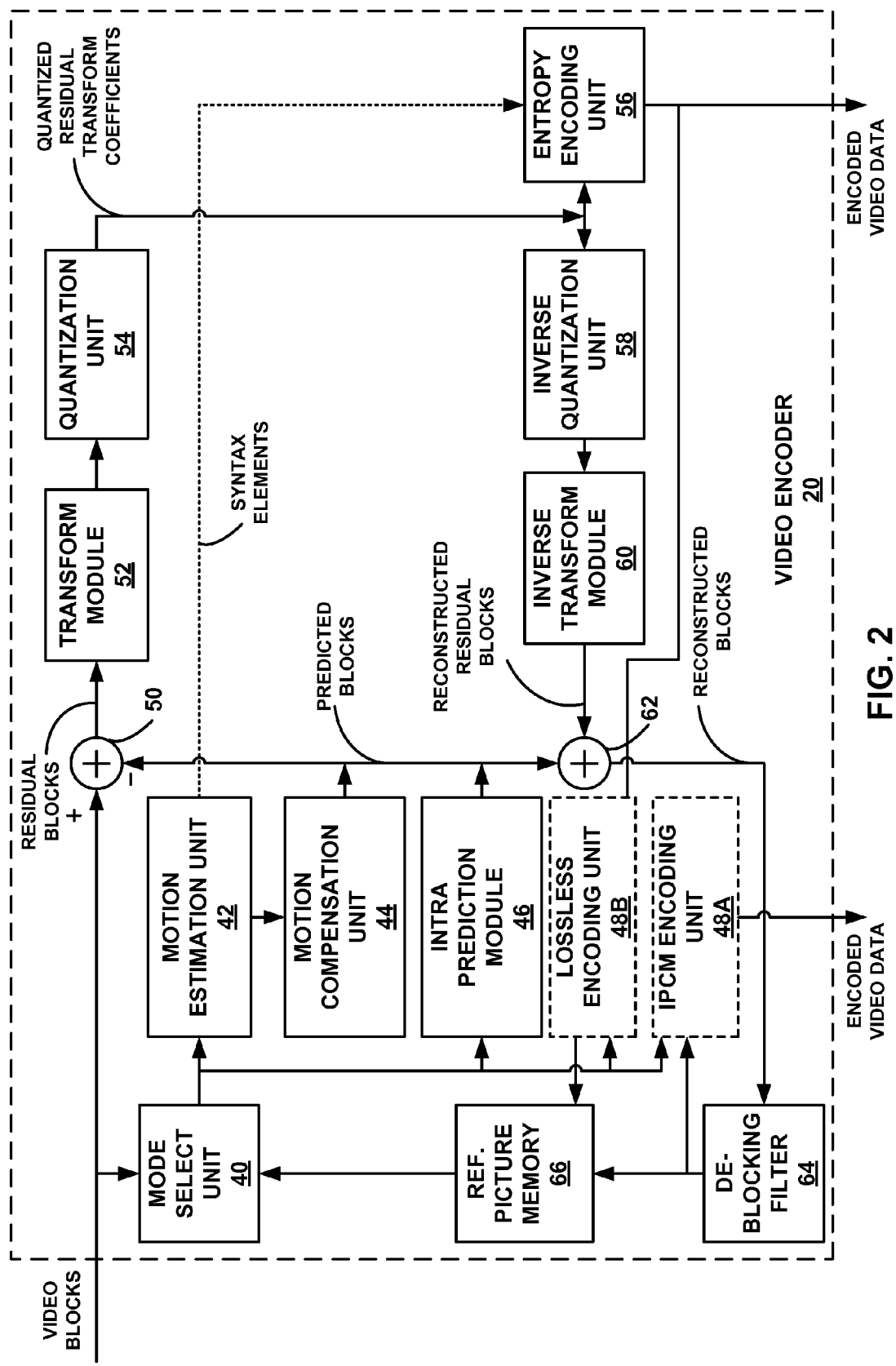
FIG. 2 is a block diagram that illustrates an example of a video encoder that may perform the techniques for IPCM and lossless coding mode deblocking, consistent with the techniques of this disclosure.
Figure 3:
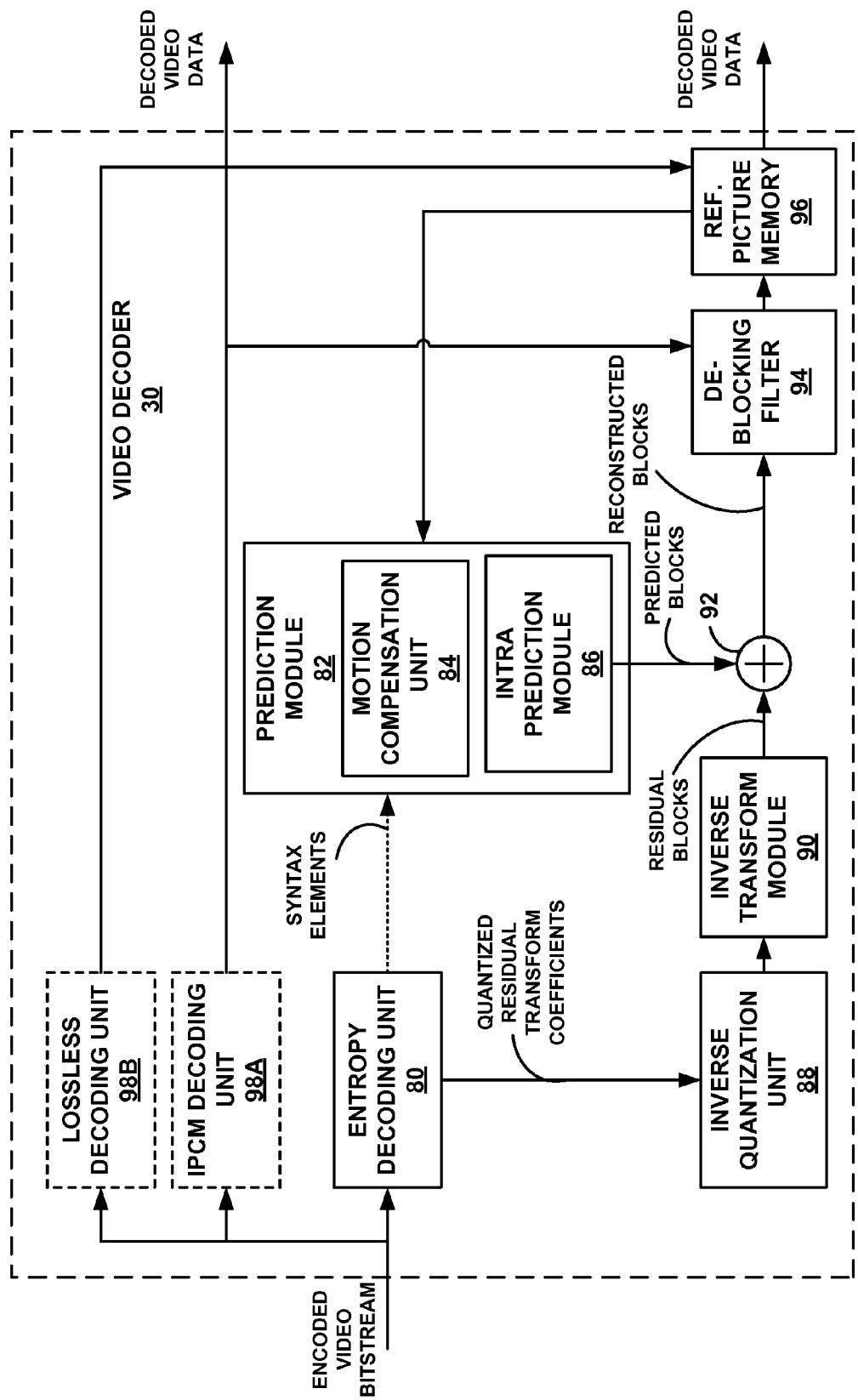
FIG. 3 is a block diagram that illustrates an example of a video decoder that may perform the techniques for IPCM and lossless coding mode deblocking, consistent with the techniques of this disclosure.

The following is discussed with reference to video encoder 20 and video decoder 30 and various components thereof, as depicted in FIGS. 2 and 3, and as described in greater detail below. According to some video coding techniques, in instances where video encoder 20 (e.g., using mode select unit 40 of FIG. 2) selects the IPCM coding mode to code a particular "current" block of video data based on error results, video encoder 20 (e.g., using IPCM encoding unit 48A of FIG. 2) may encode data, or "samples," of the current block as raw data or samples directly in a bitstream. More specifically, in some versions of the HEVC Working Draft ("WD") (e.g., version 4, or "WD4"), the IPCM intra-coding mode allows video encoder 20 to represent luma and chroma samples of a block of video data directly in a bitstream as raw data (i.e., the luma and chroma samples, or values, are coded unmodified, or "as is"). Video encoder 20 may, therefore, encode the current block as an IPCM coded block without compressing the data in the block.

In one example, video encoder 20 may select the IPCM intra-coding mode when a number of bits required to represent a compressed version of the current block (e.g., a version of the current block coded with intra-prediction or inter-prediction) exceeds a number of bits required to send an uncompressed version of the data in the block. In this case, video encoder 20 (e.g., using IPCM encoding unit 48A) may encode original uncompressed data, or samples, of the current block as IPCM samples. In some cases, the original uncompressed data may be filtered by a deblocking filter (e.g., deblocking filter 64 of FIG. 2) before being encoded as IPCM samples by video encoder 20.

In another example, video encoder 20 may use intra- or inter-prediction to generate a compressed version of the current block to be entropy encoded (e.g., using entropy encoding unit 56 of FIG. 2), and generate a reconstructed block from the compressed version of the current block for use as a reference picture. If video encoder 20 determines that an encoder pipeline stall is likely at an entropy encoding unit (e.g., entropy encoding unit 56), video encoder 20 may encode reconstructed samples of the reconstructed block as IPCM samples. In the example of FIG. 2 described below, the reconstructed block is filtered by a deblocking filter, i.e., deblocking filter 64, before being encoded as IPCM samples by an IPCM encoding unit, i.e., IPCM encoding unit 48A. In other examples, the reconstructed block may be encoded by the IPCM encoding unit without being filtered.

When video decoder 30 receives an encoded video bitstream representing blocks of video data from video encoder 20 that include IPCM samples as raw video data, video decoder 30 (e.g., using IPCM decoding unit 98B of FIG. 3) may decode the bitstream to generate a block of video data directly from the IPCM samples. As described above, in some draft versions of HEVC (e.g., WD4), the IPCM intra-coding mode allows video encoder 20 to represent luma and chroma samples of a block of video data directly in a bitstream as raw data. Video decoder 30 (e.g., using IPCM decoding unit 98A) may, therefore, decode the current block as an IPCM coded block without de-compressing the encoded data of the block.

In one example, the IPCM samples in the bitstream for the current block may be original uncompressed samples, such that the decoded block is identical to the original block. In this case, the original block generated by video decoder 30 (e.g., using IPCM decoding unit 98A) may be directly output as decoded video. In some cases, the original block generated by video decoder 30 may be filtered by a deblocking filter (e.g., deblocking filter 94 of FIG. 3) before being used as a reference picture and output as decoded video.

In another example, the IPCM samples in the bitstream for the current block may be reconstructed samples of a reconstructed version of the current block. In this case, the decoded block may be identical to the reconstructed version of the original block, which may include some distortions compared to the original block. In the example of FIG. 3 described below, the reconstructed block generated by video decoder 30, i.e., using IPCM decoding unit 98A, may be filtered by a deblocking filter, i.e., deblocking filter 94, before being used as a reference picture and output as decoded video. In other examples, the reconstructed block may be directly output from video decoder 30 (e.g., using IPCM decoding unit 98A) as decoded video without being filtered.

As such, some draft versions of HEVC (e.g., WD4) support the IPCM intra-coding mode described above, which allows an encoder (e.g., video encoder 20) to represent luma and chroma CU samples of a current block of video data directly into a bitstream as raw data. As previously explained, there are several possible usages for such IPCM intra-coding techniques. As one example, the IPCM intra-coding may be used as a means for the encoder to ensure that a size in bits of a coded representation of a block of video data does not exceed a number of bits required to send uncompressed data of the block. In such cases, the encoder may encode original samples of the data in the current block as IPCM samples. As another example, the IPCM intra-coding may be used to avoid encoder pipeline stalls. In such cases, the encoder may encode non-original samples, e.g., reconstructed samples, of data in a reconstructed version of the current block as IPCM samples.

Additionally, some draft versions of HEVC (e.g., WD4) also support signaling of a syntax element "pcm_loop_filter_disable_flag" in a sequence parameter set (SPS) associated with one or more blocks of video data to indicate whether loop filter processes are enabled for IPCM coded blocks. The loop filter processes may include deblocking filtering, adaptive loop filtering (ALF), and sample adaptive offset (SAO). If the pcm_loop_filter_disable_flag value is equal to true, or "1," both the deblocking and adaptive loop filter processes for samples of the IPCM coded blocks are disabled. Otherwise, when the pcm_loop_filter_disable_flag value is equal to false, or "0," both the deblocking and adaptive loop filter processes for the samples of the IPCM coded blocks are enabled.

When original uncompressed samples of a current block are coded as IPCM samples, the samples are distortion free. Therefore, in-loop filtering, such as deblocking filtering, ALF and SAO, is unnecessary and may be skipped. Conversely, when reconstructed samples of a reconstructed version of the current block are coded as IPCM samples, a video decoder (e.g., video decoder 30) may need to perform in-loop filtering, including deblocking filtering, along the edges of the IPCM block.

A deblocking filter (e.g., deblocking filter 64 of video encoder 20 of FIG. 2, or deblocking filter 94 of video decoder 30 of FIG. 3) in some draft versions of HEVC may filter certain TU and PU edges of a block of video data based on a result from a boundary strength computation, which is described in greater detail below with reference to FIG. 6, and deblocking decisions. For example, the deblocking decisions may include whether the deblocking filter is on or off, whether the deblocking filter is weak or strong, and the strength of a weak filter for a given block of video data. The boundary strength computation and the deblocking decisions are dependent on threshold values "$t_c$" and "$\beta$." The threshold values may be stored in a table that is accessible based on a QP value of a particular block. For example, the deblocking filter may obtain the QP value from a block that contains the current edge to be deblocked (i.e., a "luma-QP" for a luma edge and a "chroma-QP" for a chroma edge). In some draft versions of HEVC (e.g., WD6), the deblocking filtering, when applied, filters edges (e.g., edges of certain TUs and/or PUs) between two blocks (e.g., so-called "common edges"). According to these draft versions of HEVC, the edges are filtered based on an average QP (e.g., "$QP_{ave}$") value of QP values of both blocks.

As another example, a lossless coding mode has been adopted into some draft versions of HEVC (e.g., WD6). In the lossless coding mode, in one example, original, or "raw" data of a block of video data can be coded without performing the prediction, summation, transformation, quantization, and entropy coding steps described above. In another example, residual data of a block of video data is not quantized by an encoder (e.g., video encoder 20). Thus, in this example, when a decoder (e.g., video decoder 30) adds the un-quantized residual data to prediction data, the resulting video data can be a lossless reproduction of original video data encoded by the encoder. In any case, the lossless coding mode can be used, for example, by the encoder when encoding video data, and by the decoder when decoding the video data.

In a coded bitstream, setting syntax element "qpprime_y_zero_transquant_bypass_flag," or, in some examples, syntax element "cu_transquant_bypass_flag," in an SPS associated with one or more blocks of video data to a value of "1" can specify that, if a luma QP, or "$QP'_Y$," value for a current block of video data is equal to "0," a lossless coding process shall be applied to code the block. In the lossless coding mode, the scaling and transform processes and the in-loop filter processes described above can be bypassed.

In some draft versions of HEVC (e.g., WD6), the luma quantization parameter $QP'_Y$ is defined as follows:

$$QP'_Y = QP_Y + QpBdOffset_Y \qquad \text{EQ. 1}$$

where "$QpBdOffset_Y = 6*bit\_depth\_luma\_minus8$."

In this example, if the bitdepth is 8 bits, then $QpBdOffset_Y$ equals "0," or, if the bitdepth is 10 bits, then $QpBdOffset_Y$ equals "12." The range of $QP_Y$ is from "$-QpBdOffset_Y$" to "51," and the range of $QP'_Y$ is from "0" to "(51+$QpBdOffset_Y$)."

Figure 8A:
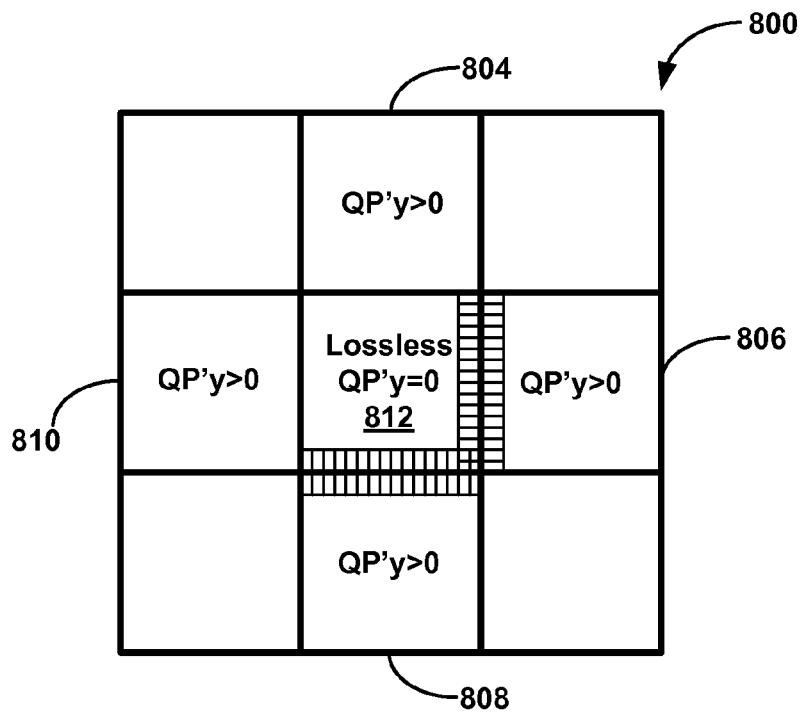
FIGS. 8A-8B are conceptual diagrams that illustrate examples of lossless coding mode deblocking, consistent with the techniques of this disclosure.

According to some draft versions of HEVC (e.g., WD6), the in-loop deblocking filter may skip processing of a current CU, or block of video data, having "$QP'_Y=0$" if the qpprime_y_zero_transquant_bypass_flag for the block equals "1." However, if the current CU, or block, is surrounded by CUs or blocks that are not losslessly coded (e.g., for which "$QP'_Y>0$"), the deblocking filter may skip the processing of left and top edges of the current CU, while the right and bottom edges of the current CU may be deblocking filtered, as illustrated in FIG. 8A, described in greater detail below. One potential problem associated with this approach is that the deblocking filter modifies the lossless samples along the right and bottom edges of the current block, as shown by the dashed portions of the lossless CU (i.e., block 812) shown in FIG. 8A.

In this example, the deblocking filter parameters β and $t_c$ can be determined based on a parameter "$QP_L$," which is an average of the $QP_Y$ values of the blocks on both sides of the current edge being deblocked. In cases where one side of the edge is losslessly coded, the $QP_L$ value can be computed using the following expression:

$$QP_L=(-QpBdOffset_Y+QP_Y+1)>>1 \qquad \text{EQ. 2}$$

The various approaches described above, relating to performing deblocking filtering for IPCM and losslessly coded blocks of video data, have several drawbacks.

As one example, in the case of an IPCM coded block, some draft versions of HEVC (e.g., WD4) specify that a QP value for the block is always equal to "0." Setting a QP value to "0" for every IPCM block effectively disables deblocking filtering on the left and top edges of the block, irrespective of a value of the pcm_loop_filter_disable_flag associated with the block. In some cases, however (e.g., when an IPCM block includes reconstructed samples), performing deblocking filtering on the left and top edges of an IPCM coded block may be desirable. Additionally, in some cases, the right and bottom edge of the IPCM block may be filtered, depending on a type and QP value of a neighboring block of video data. Furthermore, as previously described, some draft versions of HEVC (e.g., WD6) specify computing an average of the QP values of the blocks to perform deblocking filtering on the "common edge" between the blocks. As such, in cases where one block is an IPCM block, the average computation may result in halving the QP value of the other block (i.e., since the QP value of the IPCM block equals "0"). This may result in too weak of a deblocking filtering of the common edge, irrespective of the value of the pcm_loop_filter_disable_flag.

Figure 8B:
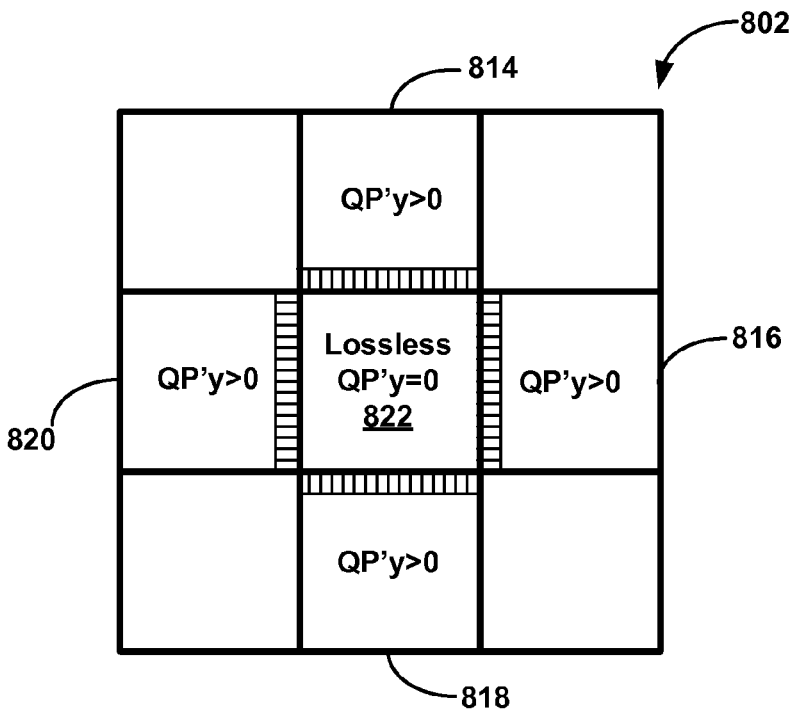

As another example, the manner in which the in-loop deblocking filtering processes described above deblocking filter, or deblock, boundary edges of lossless CUs, or blocks of video data, according to some draft versions of HEVC (e.g., WD6) may be improved using the techniques described in this disclosure. As one example, performing deblocking filtering on the right and bottom edges of a lossless CU, or block, which may modify the lossless samples of the block, may be undesirable. As another example, a $QP_L$ value derived using the above-described techniques (i.e., EQ. 2) may be inadequate in cases where the lossy samples adjacent to the losslessly coded CU, or block, are modified, as shown in FIG. 8B, which is analogous to IPCM edge deblocking in a case where the pcm_loop_filter_disable_flag is equal to true.

This disclosure describes several techniques that may, in some cases, reduce or eliminate some of the drawbacks described above. In particular, the techniques of this disclosure may provide support for performing deblocking filtering for IPCM coded blocks, losslessly coded blocks, as well as so-called "lossy" coded blocks that are located adjacent to one or more IPCM or losslessly coded blocks.

As one example, the disclosed techniques include assigning a non-zero QP value for an IPCM block, when deblocking filtering is enabled based on a predicted QP value. For example, the predicted QP value may be a QP value for a quantization group that includes the IPCM block, or a QP value for a neighboring block of video data located adjacent to, or near the IPCM block. In some cases, the disclosed techniques may only be applied to IPCM blocks consisting of reconstructed samples, since original samples are distortion free and typically do not require deblocking filtering. In other cases, the techniques may be applied to IPCM blocks consisting of reconstructed samples or original samples.

As another example, video decoder 30 may implicitly assign the non-zero QP value to the IPCM block based on a known predicted QP value. The predicted QP value may be a QP value for a quantization group that includes the IPCM block, or for a neighboring block of the IPCM block. For example, when the IPCM block has a size that is smaller than a minimum CU quantization group size, video decoder 30 may set the assigned non-zero QP value for the IPCM block equal to a QP value for a quantization group that includes the IPCM block. The quantization group may include one or more blocks of video data, or CUs, that are smaller than the minimum CU quantization group size, and that all have a same QP value. When the IPCM block has a size that is greater or equal to the minimum CU quantization group size, video decoder 30 may set the assigned non-zero QP value for the IPCM block equal to a QP value for a neighboring block of the IPCM block. The neighboring block may be a block of video data located to the left of the IPCM block, or a closest previous block of the IPCM block in a coding order.

As yet another example, video encoder 20 may assign the non-zero QP value to the IPCM block based on the predicted QP value, and explicitly signal the assigned non-zero QP value to video decoder 30. For example, video encoder 20 may signal a dQP value for the IPCM block that represents a difference between the assigned non-zero QP value and the predicted QP value. In this case, video decoder 30 may assign the non-zero QP value to the IPCM block based on the received dQP value for the IPCM block and the predicted QP value. Video decoder 30 may then apply a deblocking filter to the samples of the IPCM block based on the assigned non-zero QP value for the IPCM block. In other examples, video encoder 20 may signal the assigned non-zero QP value to video decoder 30 directly.

As still another example, according to the techniques of this disclosure, as illustrated in FIG. 8B, a deblocking filter can be turned off for all boundary edges (i.e., the top, bottom, left, and right boundary edges) of a losslessly coded CU, or block of video data, with $QP'_Y=0$, if the qpprime_y_zero_transquant_bypass_flag for the block equals "1." For example, $QP'_Y$ values on both sides of a current edge to be deblocked (i.e., $QP'_Y$ values for the losslessly coded block and an adjacent block that share the current edge to be deblocked) can be checked, and, if at least one such value is equal to "0," deblocking can be skipped. Alternatively, $QP_Y$ values on both sides of the current edge can be checked, and, if at least one such value is equal to "$-QpBdOffset_Y$," the deblocking can be skipped. To avoid the testing of QP values for internal edges (for example, "TU" edges) of the losslessly coded CU or block, the deblocking filter can disable processing of these edges. For example, the parameter "bInternalEdge" can be set to false for the entire CU or block, in some examples.

As another example, according to the techniques of this disclosure, as illustrated in FIG. 8B, a deblocking filter can modify lossy block samples that are located adjacent to a losslessly coded CU or block, while leaving the lossless CU samples unmodified. This approach is similar to the case of deblocking of boundary edges of an IPCM CU or block with pcm_loop_filter_disable_flag equal to true. Consistent with the disclosed techniques, the manner in which the $QP_L$ value used to determine the deblocking filter parameters $\beta$ and $t_c$ is computed according to some draft versions of HEVC can be changed, or redefined, since the $QP_L$ value computed using such techniques (see, e.g., EQ. 2 above) may be inadequate for providing visually pleasing integration of losslessly coded CUs or blocks in a surrounding lossy coded region. One potential solution proposed by this disclosure is to use a maximum of the two $QP_{Y,P/Q}$ values for deblocking a current edge shared by a losslessly coded block and an adjacent lossy block, as shown in the following expression:

$$QP_L = \max(QP_{Y,P}, QP_{Y,Q}) \qquad \text{EQ. 3}$$

where P and Q represent the blocks (i.e., the losslessly coded and lossy blocks) on both sides of the current edge (e.g. left and right, or top and bottom blocks). This is equivalent to using a $QP_Y$ value of a CU or block that is located on a lossy coded side of an edge between blocks P and Q, as is illustrated in Table 1 below.

TABLE 1

$QP_L$ for deblocking filtering an edge between blocks P and Q as a function of a lossless coding mode of both blocks.

| Is block P in lossless CU? | Is block Q in lossless CU? | $QP_L$ for deblocking |
|---|---|---|
| Yes | No | $QP_{Y,Q}$ |
| No | Yes | $QP_{Y,P}$ |
| No | No | $(QP_{Y,P} + QP_{Y,Q} + 1)/2$ |
| Yes | Yes | No deblocking of edge |

The following pseudo-code can be used to obtain the proposed "modified QPL derivation," without the need for determining special conditions (e.g., the lossless mode determination may be already available):

```
if( CU_Q->isLosslessCoded(PartQIdx) )
{
  QP_Q = 0;
  QP_P <<= 1;
}
if( CU_P->isLosslessCoded(PartPIdx) )
{
  QP_P = 0;
  QP_Q <<= 1;
}
QP_L = (QP_P + QP_Q + 1) >> 1;
```

The techniques proposed in this disclosure may, in some instances, smooth edge discontinuities between lossy coded regions and losslessly coded regions by the proposed derivation of the $QP_L$ for determining deblocking strength. Using other techniques, boundary discontinuities between losslessly coded and lossy coded regions can result in clearly visible boundaries. The techniques proposed in this disclosure, which include determining an appropriate $QP_L$ for a deblocking filtering, may, in some instances, help to reduce boundary discontinuities.

To enable the above-described deblocking behavior consistent with the techniques of this disclosure, a single-bit code, or "flag" may be signaled in the SPS, a picture parameter set (PPS), an adaptation parameter set (APS), or slice header. For example, a syntax element "lossless_loop_filter_enable_flag" equal to "1" may be used to enable the deblocking filtering of the lossy coded samples adjacent to the lossless CU, or block edge, as shown in FIG. 8B, while the flag equal to "0" may be used to disable deblocking of all boundaries of the lossless CU. Alternatively, the definition of the pcm_loop_filter_disable_flag described above with reference to IPCM coded blocks can be extended to also cover the case of losslessly coded CUs or blocks. For example, in cases where the pcm_loop_filter_disable_flag is equal to true (e.g., equal to "1"), the deblocking behavior depicted in FIG. 8B can apply to both IPCM and lossless CU boundary edges. If the pcm_loop_filter_disable_flag is equal to false (e.g., equal to "0"), the deblocking of lossless CU boundaries may be completely disabled, while IPCM deblocking may be enabled on both sides of the IPCM boundaries.

In another example, if the pcm_loop_filter_disable_flag is equal to false, then the deblocking of lossless CU or block boundaries may be enabled on both sides of the boundaries, as is the case for IPCM boundaries. In yet another example, if the pcm_loop_filter_disable_flag is equal to false, then the deblocking of lossless CU or block boundaries and of IPCM boundaries may be disabled on both sides of the boundaries, and if the pcm_loop_filter_disable_flag is equal to true, the deblocking of lossless CU boundaries and IPCM boundaries may be enabled on one side only, as depicted in FIG. 8B. The pcm_loop_filter_disable_flag may be renamed to syntax element "pcm_transquant_loopfilter_disable flag" to reflect its applicability to and use within both of the IPCM coding mode and the lossless coding mode.

Accordingly, the two values for the pcm_loop_filter_disable_flag may correspond to (1) enabling deblocking for both sides and disabling deblocking for both sides, (2) enabling deblocking for both sides and mix, or (3) disabling deblocking for both sides and mix. "Both sides" in this context refers to the two sides of a boundary between a lossy coded CU or block and a losslessly coded CU or block (i.e. one boundary edge internal to the losslessly coded CU, and one boundary edge internal to the lossy coded CU, as shown in FIGS. 8A and 8B). "Mix" in this context generally refers to the techniques described herein where deblocking filtering is performed for the internal boundary edge of a lossy coded CU, but deblocking filtering is disabled for the internal boundary edge of a losslessly coded CU.

As still another example, according to the techniques of this disclosure, a QP value or a syntax element "delta_QP" value for the current block may be signaled, e.g., from video encoder 20 to video decoder 30, together with lossless CU data for the block, to control deblocking filtering along boundary edges of the current block and one or more other blocks. According to yet another technique of this disclosure, a QP value for the current block used to control deblocking filtering along one or more boundary edges of a losslessly coded CU or block can be predicted from a $QP_Y$ value or a delta_QP value from lossy coded CUs or blocks. According to other techniques of this disclosure, a constant QP value (e.g., "0," or another value) may be assigned to a lossless CU to control the deblocking along the boundary edges.

Accordingly, in some examples consistent with the techniques of this disclosure, video encoder 20 of source device 12 may be configured to encode certain blocks of video data (e.g., one or more PUs or TUs of a CU). In these examples, video decoder 30 of destination device 14 may be configured to receive the encoded video data from video encoder 20 and decode the video data. As one example, video encoder 20 and/or video decoder 30 may be configured to code a plurality of blocks of video data, wherein at least one block of the plurality of blocks of video data is coded using a coding mode that is one of an IPCM coding mode and a lossless coding mode. In some examples, the lossless coding mode may correspond to lossless coding mode that uses prediction. In these examples, video encoder 20 and/or video decoder 30 may perform at least the prediction and summation steps described above to generate residual data of a block of video data. Furthermore, in these examples, video encoder 20 and/or video decoder 30 may avoid quantizing the residual data. In other examples, however, the lossless coding mode may correspond to a lossless coding mode where no prediction is used (e.g., where original, or "raw" data of a block of video data is coded without performing the prediction, summation, transformation, quantization, and entropy coding steps described above). In any case, in this example, video encoder 20 and/or video decoder 30 may be further configured to assign a non-zero QP value for the at least one block coded using the coding mode. Also in this example, video encoder 20 and/or video decoder 30 may be still further configured to perform deblocking filtering on one or more of the plurality of blocks of video data based on the coding mode used to code the at least one block and the assigned non-zero QP value for the at least one block.

In this manner, the techniques of this disclosure may enable video encoder 20 and/or video decoder 30 to improve visual quality of one or more blocks of video data when coding the one or more blocks, compared to other techniques. In particular, the described techniques may improve visual quality of one or more IPCM coded blocks consisting of reconstructed video data by enabling deblocking filtering for the blocks and performing the deblocking filtering in a particular manner. Additionally, the techniques may improve visual quality of one or more losslessly coded blocks that include original video data (e.g., whether coded as original, or "raw" video data, or as residual un-quantized video data) by disabling deblocking filtering for the blocks. Furthermore, the techniques also may improve visual quality of one or more blocks coded using lossy coding modes, e.g., blocks located adjacent to one or more IPCM or losslessly coded blocks, by performing deblocking filtering on the blocks in a particular manner. As a result, there may be a relative improvement in visual quality of one or more blocks of video data including blocks coded using IPCM, lossless, and lossy coding modes, when using the techniques of this disclosure.

Video encoder 20 and video decoder 30 each may be implemented as any of a variety of suitable encoder or decoder circuitry, as applicable, such as one or more microprocessors, DSPs. ASICs, FPGAs, discrete logic circuitry, software, hardware, firmware, or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit (IC), a microprocessor, and/or a wireless communication device, such as a cellular telephone.

FIG. 2 is a block diagram that illustrates an example of a video encoder that may perform the techniques for IPCM and lossless coding mode deblocking, consistent with the techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, motion estimation unit 42, motion compensation unit 44, intra-prediction module 46, IPCM encoding unit 48A, lossless encoding unit 48B, reference picture memory 66, summer 50, transform module 52, quantization unit 54, and entropy encoding unit 56. For video block reconstruction, video encoder 20 also includes inverse quantization unit 58, inverse transform module 60, and summer 62. A deblocking filter 64 is also included to filter block boundaries to remove blockiness artifacts from reconstructed video.

As shown in FIG. 2, video encoder 20 receives a current video block within a video slice to be encoded. The slice may be divided into multiple video blocks. Mode select unit 40 may select one of the coding modes, intra-, inter-, IPCM, or lossless, for the current video block based on error results. If the intra- or inter-modes are selected, mode select unit 40 provides the resulting intra- or inter-coded block to summer 50 to generate residual block data and to summer 62 to reconstruct the encoded block for use as a reference picture. Intra-prediction module 46 performs intra-predictive coding of the current video block relative to one or more neighboring blocks in the same frame or slice as the current block to be coded to provide spatial compression. Motion estimation unit 42 and motion compensation unit 44 perform inter-predictive coding of the current video block relative to one or more predictive blocks in one or more reference pictures to provide temporal compression.

In the case of inter-coding, motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 66. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a QP. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform CAVLC, CABAC, or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 66. The reference block may be used by motion estimation unit 42 and motion compensation unit 44 as a reference block to inter-predict a block in a subsequent video frame or picture.

As described above with reference to FIG. 1, video encoder 20 also includes IPCM encoding unit 48A and lossless encoding unit 48B that may enable video encoder 20 to perform the IPCM and lossless coding techniques attributed to video encoder 20 in disclosure.

As one example, video encoder 20 may be configured to encode one or more blocks of video data during a video coding process. For example, video encoder 20 may be configured to encode a plurality of blocks of video data, wherein video encoder 20 encodes at least one block of the plurality of blocks of video data using a coding mode that is one of an IPCM coding mode and a lossless coding mode. As previously explained, in some examples, the lossless coding mode may include performing prediction for the at least one block to code the block (e.g., along with summation to generate residual data of the at least one block). In other examples, however, the lossless coding mode may be used to code the at least one block without performing prediction (e.g., as original, or "raw" video data).

For example, as previously described, the at least one block of the plurality of blocks of video data encoded using the IPCM coding mode may correspond to the at least one block including reconstructed video data. For example, the reconstructed video data may be generated by video encoder 20 by performing the prediction, summation, transformation, and quantization steps described above with reference to video encoder 20 of FIG. 1 using a block of original video data. By performing the above-described steps, video encoder 20 may generate a block of quantized and transformed residual coefficients. Subsequently, video encoder 20 may be configured to perform inverse quantization, inverse transformation, prediction, and summation on the quantized and transformed residual coefficients, as also described above, to generate the block of reconstructed video data. Alternatively, as also previously described, the at least one block encoded using the lossless coding mode may correspond to the at least one block including original video data, or residual un-quantized video data.

In any case, video encoder 20 may be further configured to assign a non-zero QP value for the at least one block encoded using the coding mode. As previously described, video encoder 20 may be configured to assign the non-zero QP value for the at least one block using e.g., a predicted QP value for the at least one block, which may be determined using a QP value of each of one or more neighboring blocks of video data. Video encoder 20 may also be configured to perform deblocking filtering on one or more of the plurality of blocks of video data based on the coding mode used by video encoder 20 to encode the at least one block and the assigned non-zero QP value for the at least one block.

In some examples, to perform the deblocking filtering on the one or more of the plurality of blocks of video data based on the coding mode used to code the at least one block and the assigned non-zero QP value, video encoder 20 may be configured to perform following steps. For example, if the coding mode used to code the at least one block is the IPCM coding mode, video encoder 20 may be configured to perform the deblocking filtering on the at least one block based on the assigned non-zero QP value. Furthermore, if the coding mode used to code the at least one block is the lossless coding mode, video encoder 20 may be configured to perform the deblocking filtering on an adjacent block of the plurality of blocks of video data based on the assigned non-zero QP value. In this example, the adjacent block may be located adjacent to the at least one block and coded using a lossy coding mode.

In some examples, to perform the deblocking filtering on each of the at least one block and the adjacent block based on the assigned non-zero QP value, video encoder 20 may be configured to select a filter for the deblocking filtering based on the assigned non-zero QP value. For example, video encoder 20 may be configured to select the filter, using the assigned non-zero QP value, such that the filter includes one or more filtering parameters or properties that define the manner in which the deblocking filtering, using the filter, is performed. In other examples, to perform the deblocking filtering on each of the at least one block and the adjacent block based on the assigned non-zero QP value, video encoder 20 may be configured to determine a filter strength for the deblocking filtering based on the assigned non-zero QP value, as described above with reference to deblocking decisions.

In some examples, video encoder 20 may be configured to, prior to performing the deblocking filtering on the one or more of the plurality of blocks of video data based on the coding mode used to code the at least one block and the assigned non-zero QP value, enable the deblocking filtering for the one or more of the plurality of blocks of video data. In other examples, the coding mode may be the lossless coding mode. In these examples, video encoder 20 may be further configured to disable deblocking filtering for the at least one block. In these examples, disabling the deblocking filtering for the at least one block may include not performing the deblocking filtering for internal boundary edges of the at least one block.

In some examples, to assign the non-zero QP value for the at least one block, video encoder 20 may be configured to determine the assigned non-zero QP value based on one or more of the following: (1) a signaled QP value for the at least one block (e.g., wherein the signaled QP value indicates the assigned non-zero QP value); (2) a predicted QP value for the at least one block (e.g., determined using a QP value of each of one or more neighboring blocks of video data); and (3) a signaled dQP value for the at least one block (e.g., wherein the dQP value represents a difference between the assigned non-zero QP value and the predicted QP value). As one example, each of the signaled QP and dQP values, when applicable, may be determined by video encoder 20 and signaled to video decoder 30 in a bitstream. As another example, the predicted QP value may be determined by video encoder 20.

In other examples, in instances where the coding mode used to code the at least one block is the IPCM coding mode, to assign the non-zero QP value for the at least one block, video encoder 20 may be configured to perform the following steps. For example, when a size of the at least one block is smaller than a minimum CU quantization group size, video encoder 20 may be configured to set at least one group QP value for a quantization group that includes the at least one block as the assigned non-zero QP value. In these examples, the quantization group may also include one or more blocks of video data coded using a lossy coding mode.

As described above, in some examples, each of the blocks of video data included within the quantization group may have a same group QP value. In these examples, video encoder 20 may be configured to set this common group QP value as the assigned non-zero QP value. In other examples, however, only some blocks of the quantization group (e.g., blocks starting from a first block of the quantization group for which the QP value is signaled, for example, as a dQP value) may have a same group QP value. In these examples, video encoder 20 may be configured to set this particular group QP value that is common to only a subset of the blocks of the quantization group as the assigned non-zero QP value.

Furthermore, when the size of the at least one block is greater than or equal to the minimum CU quantization group size, video encoder 20 may be configured to set a QP value for a neighboring block of the plurality of blocks of video data as the assigned non-zero QP value. For example, the neighboring block may be one or more of a block located adjacent to the at least one block and a previously coded block.

In still other examples, in instances where the coding mode used to code the at least one block is the IPCM coding mode, to assign the non-zero QP value for the at least one block, video encoder 20 may be configured to set a QP value for a neighboring block of the plurality of blocks of video data as the assigned non-zero QP value when a size of the at least one block is smaller than a minimum CU quantization group size. In these examples, the neighboring block may be one or more of a block located adjacent to the at least one block and a previously coded block. For example, in cases where the at least one block is a so-called "edge" block (i.e., a block of video data located adjacent to a boundary of a frame of video data that includes the block), the block located adjacent to the at least one block may not exist. In such cases, the neighboring block may be the previously coded block, i.e., a block of video data that occurs prior to the at least one block in a coding order associated with a frame of video data that includes the at least one block and the previously coded block.

In some examples, in instances where the coding mode used to code the at least one block is the lossless coding mode, to assign the non-zero QP value for the at least one block, video encoder 20 may be configured to set one of a QP value and a dQP value for a lossy block of the plurality of blocks of video data as the assigned non-zero QP value. In these examples, the dQP value may represent a difference between the QP value and a predicted QP value for the lossy block. Also in these examples, the lossy block may be a block coded using a lossy coding mode, e.g., a coding mode that includes performing the prediction, summation, transformation, and quantization steps described above, or similar steps.

In other examples, in instances where the coding mode used to code the at least one block is the lossless coding mode, to assign the non-zero QP value for the at least one block, video encoder 20 may be configured to set a constant value as the assigned non-zero QP value.

In some examples, coding may be encoding. In these examples, to encode the at least one block, video encoder 20 may be configured to signal one of residual un-quantized video data and reconstructed video data of the at least one block in a bitstream. Also in these examples, to assign the non-zero QP value for the at least one block, video encoder 20 may be configured to perform one of signaling the assigned non-zero QP value in the bitstream, and signaling a dQP value for the at least one block in the bitstream. For example, the dQP value may represent a difference between the assigned non-zero QP value and a predicted QP value for the at least one block. In these examples, video encoder 20 may be further configured to signal one or more syntax elements in the bitstream. For example, the one or more syntax elements may indicate that the deblocking filtering is enabled for the one or more of the plurality of blocks of video data.

In the above-described examples, particularly in instances where the coding mode used to code the at least one block is the lossless coding mode, the one or more syntax elements may be referred to as "first" one or more syntax elements. In these examples, video encoder 20 may be further configured to signal a second one or more syntax elements in the bitstream. For example, the second one or more syntax elements may indicate that the deblocking filtering is disabled for the at least one block.

Accordingly, as explained above, the techniques of this disclosure may enable video encoder 20 to improve visual quality of one or more blocks of video data when encoding the one or more blocks, compared to other techniques. In particular, the described techniques may improve visual quality of one or more IPCM coded blocks consisting of reconstructed video data by enabling deblocking filtering for the blocks and performing the deblocking filtering in a particular manner. Additionally, the techniques may improve visual quality of one or more losslessly coded blocks that include original video data by disabling deblocking filtering for the blocks. Furthermore, the techniques also may improve visual quality of one or more blocks coded using lossy coding modes, e.g., one or more blocks located adjacent to one or more IPCM or losslessly coded blocks, by performing deblocking filtering on the lossy coded blocks in a particular manner. As a result, there may be a relative improvement in visual quality of one or more blocks of video data, including IPCM, lossless, and lossy coded blocks, when using the techniques of this disclosure.

In this manner, video encoder 20 represents an example of a video coder configured to code a plurality of blocks of video data, wherein the video coder is configured to code at least one block of the plurality of blocks of video data using a coding mode that is one of an IPCM coding mode and a lossless coding mode that uses prediction. Also in this example, the video coder is further configured to assign a non-zero QP value for the at least one block coded using the coding mode and perform deblocking filtering on one or more of the plurality of blocks of video data based on the coding mode used to code the at least one block and the assigned non-zero QP value for the at least one block.

FIG. 3 is a block diagram that illustrates an example of a video decoder that may perform the techniques for IPCM and lossless coding mode deblocking, consistent with the techniques of this disclosure. In the example of FIG. 3, video decoder 30 includes an entropy decoding unit 80, an IPCM decoding unit 98A, a lossless decoding unit 98B, a prediction module 82, an inverse quantization unit 88, an inverse transform module 90, a summer 92, a deblocking filter 94, and a reference picture memory 96. Prediction module 82 includes motion compensation unit 84 and intra-prediction module 86. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. When the represented video blocks in the bitstream include compressed video data, entropy decoding unit 80 of video decoder 30 entropy decodes the bitstream to generate quantized coefficients, motion vectors, and other syntax elements. Entropy decoding unit 80 forwards the motion vectors and other syntax elements to prediction module 82. Video decoder 30 may receive the syntax elements at the video slice level and/or the video block level.

When the video slice is coded as an intra-coded (I) slice, intra-prediction module 86 of prediction module 82 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 84 of prediction module 82 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 96.

Motion compensation unit 84 determines prediction information for a video block of the current video slice by parsing the motion vectors and other syntax elements, and uses the prediction information to produce the predictive blocks for the current video block being decoded. For example, motion compensation unit 84 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 84 may also perform interpolation based on interpolation filters. Motion compensation unit 84 may use interpolation filters as used by video encoder 20 during encoding of the video blocks to calculate interpolated values for sub-integer pixels of reference blocks. Motion compensation unit 84 may determine the interpolation filters used by video encoder 20 from the received syntax elements and use the interpolation filters to produce predictive blocks.

Inverse quantization unit 88 inverse quantizes. i.e., de-quantizes, the quantized transform coefficients provided in the bitstream and decoded by entropy decoding unit 80. The inverse quantization process may include use of a quantization parameter (QP) calculated by video encoder 20 for each video block in the video slice to determine a degree of quantization and, likewise, a degree of inverse quantization that should be applied. Inverse transform module 90 applies an inverse transform, e.g., an inverse DCT, an inverse integer transform, or a conceptually similar inverse transform process, to the transform coefficients in order to produce residual blocks in the pixel domain.

After motion compensation unit 84 generates the predictive block for the current video block based on the motion vectors and other syntax elements, video decoder 30 forms a decoded video block by summing the residual blocks from inverse transform module 90 with the corresponding predictive blocks generated by motion compensation unit 84. Summer 92 represents the component or components that perform this summation operation. A deblocking filter 94 is applied to filter the decoded blocks in order to remove blockiness artifacts. The decoded video blocks in a given frame or picture are then stored in reference picture memory 96, which stores reference pictures used for subsequent motion compensation. Reference picture memory 96 also stores decoded video for later presentation on a display device, such as display device 28 of FIG. 1.

As already described above with reference to FIG. 1, video decoder 30 also includes IPCM decoding unit 98A and lossless decoding unit 98B that may enable video decoder 30 to perform the IPCM and lossless coding techniques attributed to video decoder 30 in disclosure.

As one example, video decoder 30 may be configured to decode one or more blocks of video data during a video coding process. For example, video decoder 30 may be configured to decode a plurality of blocks of video data, wherein at least one block of the plurality of blocks of video data may be encoded, i.e., by video encoder 20, using a coding mode that is one of an IPCM coding mode and a lossless coding mode. As explained above with reference to FIGS. 1 and 2, in some examples, the lossless coding mode may include performing prediction for the at least one block to code the block (e.g., along with summation to generate residual data of the at least one block). In other examples, however, the lossless coding mode may be used to code the at least one block without performing prediction (e.g., as original, or "raw" video data).

As one example, as previously described, the at least one block of the plurality of blocks of video data encoded using the IPCM coding mode may correspond to the at least one block including reconstructed video data. For example, the reconstructed video data may be generated by, e.g., video encoder 20, by performing the prediction, summation, transformation, and quantization steps described above with reference to video encoder 20 of FIGS. 1 and 2 using a block of original video data. By performing the above-described steps, video encoder 20 may generate a block of quantized and transformed residual coefficients. Subsequently, video encoder 20 may be configured to perform inverse quantization, inverse transformation, prediction, and summation on the quantized and transformed residual coefficients, as also described above, to generate the block of reconstructed video data. Alternatively, as also previously described, the at least one block encoded using the lossless coding mode may correspond to the at least one block including original video data, or residual un-quantized video data.

In any case, video decoder 30 may be further configured to assign a non-zero QP value for the at least one block encoded using the coding mode. As previously described, video decoder 30 may be configured to assign the non-zero QP value for the at least one block using e.g., a predicted QP value for the at least one block, which may be determined using a QP value of each of one or more neighboring blocks of video data. Video decoder 30 may also be configured to perform deblocking filtering on one or more of the plurality of blocks of video data based on the coding mode used to code the at least one block and the assigned non-zero QP value for the at least one block.

In some examples, to perform the deblocking filtering on the one or more of the plurality of blocks of video data based on the coding mode used to code the at least one block and the assigned non-zero QP value, video decoder 30 may be configured to perform following steps. For example, if the coding mode used to code the at least one block is the IPCM coding mode, video decoder 30 may be configured to perform the deblocking filtering on the at least one block based on the assigned non-zero QP value. Furthermore, if the coding mode used to code the at least one block is the lossless coding mode, video decoder 30 may be configured to perform the deblocking filtering on an adjacent block of the plurality of blocks of video data based on the assigned non-zero QP value. In this example, the adjacent block may be located adjacent to the at least one block and coded using a lossy coding mode.

In some examples, to perform the deblocking filtering on each of the at least one block and the adjacent block based on the assigned non-zero QP value, video decoder 30 may be configured to select a filter for the deblocking filtering based on the assigned non-zero QP value. For example, video decoder 30 may be configured to select the filter, using the assigned non-zero QP value, such that the filter includes one or more filtering parameters or properties that define the manner in which the deblocking filtering, using the filter, is performed. In other examples, to perform the deblocking filtering on each of the at least one block and the adjacent block based on the assigned non-zero QP value, video decoder 30 may be configured to determine a filter strength for the deblocking filtering based on the assigned non-zero QP value, as described above with reference to deblocking decisions.

In some examples, video decoder 30 may be configured to, prior to performing the deblocking filtering on the one or more of the plurality of blocks of video data based on the coding mode used to code the at least one block and the assigned non-zero QP value, enable the deblocking filtering for the one or more of the plurality of blocks of video data. In other examples, the coding mode may be the lossless coding mode. In these examples, video decoder 30 may be further configured to disable deblocking filtering for the at least one block. In these examples, disabling the deblocking filtering for the at least one block may include not performing the deblocking filtering for internal boundary edges of the at least one block.

In some examples, to assign the non-zero QP value for the at least one block, video decoder 30 may be configured to determine the assigned non-zero QP value based on one or more of the following: (1) a signaled QP value for the at least one block (e.g., wherein the signaled QP value indicates the assigned non-zero QP value); (2) a predicted QP value for the at least one block (e.g., determined using a QP value of each of one or more neighboring blocks of video data); and (3) a signaled dQP value for the at least one block (e.g., wherein the dQP value represents a difference between the assigned non-zero QP value and the predicted QP value). As one example, each of the signaled QP and dQP values, when applicable, may be received by video decoder 30 from video encoder 20 in a bitstream. As another example, the predicted QP value may be determined by video decoder 30.

In other examples, in instances where the coding mode used to code the at least one block is the IPCM coding mode, to assign the non-zero QP value for the at least one block, video decoder 30 may be configured to perform the following steps. For example, when a size of the at least one block is smaller than a minimum CU quantization group size, video decoder 30 may set a group QP value, e.g., at least one group QP value, for a quantization group that includes the at least one block as the assigned non-zero QP value. In these examples, the quantization group may also include one or more blocks of video data coded using a lossy coding mode. As described above, in some examples, each of the blocks of video data included within the quantization group may have a same group QP value. In these examples, video decoder 30 may be configured to set this common group QP value as the assigned non-zero QP value. In other examples, however, only some blocks of the quantization group (e.g., blocks starting from a first block of the quantization group for which the QP value is signaled, for example, as a dQP value) may have a same group QP value. In these examples, video decoder 30 may be configured to set this particular group QP value that is common to only a subset of the blocks of the quantization group as the assigned non-zero QP value. Furthermore, when the size of the at least one block is greater than or equal to the minimum CU quantization group size, video decoder 30 may be configured to set a QP value for a neighboring block of the plurality of blocks of video data as the assigned non-zero QP value. For example, the neighboring block may be one or more of a block located adjacent to the at least one block and a previously coded block.

In still other examples, in instances where the coding mode used to code the at least one block is the IPCM coding mode, to assign the non-zero QP value for the at least one block, video decoder 30 may be configured to set a QP value for a neighboring block of the plurality of blocks of video data as the assigned non-zero QP value when a size of the at least one block is smaller than a minimum CU quantization group size. In these examples, the neighboring block may be one or more of a block located adjacent to the at least one block and a previously coded block. For example, in cases where the at least one block is a so-called "edge" block (i.e., a block of video data located adjacent to a boundary of a frame of video data that includes the block), the block located adjacent to the at least one block may not exist. In such cases, the neighboring block may be the previously coded block, i.e., a block of video data that occurs prior to the at least one block in a coding order associated with a frame of video data that includes the at least one block and the previously coded block.

In some examples, in instances where the coding mode used to code the at least one block is the lossless coding mode, to assign the non-zero QP value for the at least one block, video decoder 30 may be configured to set one of a QP value and a dQP value for a lossy block of the plurality of blocks of video data as the assigned non-zero QP value. In a similar manner as previously described, in these examples, the dQP value may represent a difference between the QP value and a predicted QP value for the lossy block. Also in these examples, the lossy block may be a block coded using a lossy coding mode, e.g., a coding mode that includes performing the prediction, summation, transformation, and quantization steps described above, or similar steps.

In other examples, in instances where the coding mode used to code the at least one block is the lossless coding mode, to assign the non-zero QP value for the at least one block, video decoder 30 may be configured to set a constant value as the assigned non-zero QP value.

In some examples, coding may be decoding. In these examples, to decode the at least one block, video decoder 30 may be configured to receive one of residual un-quantized video data and reconstructed video data of the at least one block in a received bitstream. Also in these examples, to assign the non-zero QP value for the at least one block, video decoder 30 may be configured to perform one of receiving the assigned non-zero QP value in the received bitstream, and receiving a dQP value for the at least one block in the received bitstream. For example, the dQP value may represent a difference between the assigned non-zero QP value and a predicted QP value for the at least one block. In examples where video decoder 30 is configured to receive the dQP value for the at least one block, video decoder 30 may be further configured to determine the assigned non-zero QP value based on the dQP value and the predicted QP value. Video decoder 30 may be still further configured to receive one or more syntax elements in the received bitstream. For example, the one or more syntax elements may indicate that the deblocking filtering is enabled for the one or more of the plurality of blocks of video data.

In the above-described examples, particularly in instances where the coding mode used to code the at least one block is the lossless coding mode, the one or more syntax elements may be referred to as "first" one or more syntax elements. In these examples, video decoder 30 may be further configured to receive "second" one or more syntax elements in the received bitstream. For example, the second one or more syntax elements may indicate that the deblocking filtering is disabled for the at least one block.

Accordingly, as explained above, the techniques of this disclosure may enable video decoder 30 to improve visual quality of one or more blocks of video data when encoding the one or more blocks, compared to other techniques. In particular, the described techniques may improve visual quality of one or more IPCM coded blocks consisting of reconstructed video data by enabling deblocking filtering for the blocks and performing the deblocking filtering in a particular manner. Additionally, the techniques may improve visual quality of one or more losslessly coded blocks that include original video data by disabling deblocking filtering for the blocks. Furthermore, the techniques also may improve visual quality of one or more blocks coded using lossy coding modes, e.g., one or more blocks located adjacent to one or more IPCM or losslessly coded blocks, by performing deblocking filtering on the lossy coded blocks in a particular manner. As a result, there may be a relative improvement in visual quality of one or more blocks of video data, including IPCM, lossless, and lossy coded blocks, when using the techniques of this disclosure.

In this manner, video decoder 30 represents an example of a video coder configured to code a plurality of blocks of video data, wherein the video coder is configured to code at least one block of the plurality of blocks of video data using a coding mode that is one of an IPCM coding mode and a lossless coding mode that uses prediction. Also in this example, the video coder is further configured to assign a non-zero QP value for the at least one block coded using the coding mode and perform deblocking filtering on one or more of the plurality of blocks of video data based on the coding mode used to code the at least one block and the assigned non-zero QP value for the at least one block.

Figure 4:
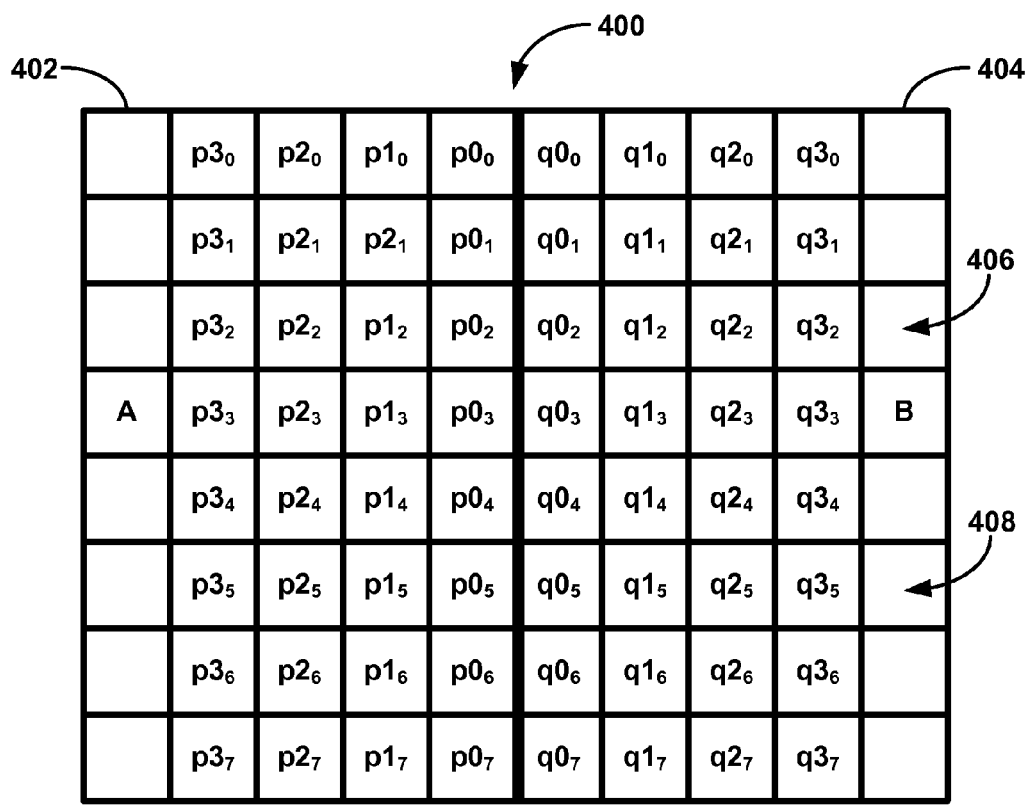
FIG. 4 is a conceptual diagram that illustrates an example of deblocking filtering performed on a boundary of two adjacent blocks of video data, consistent with the techniques of this disclosure.

FIG. 4 is a conceptual diagram that illustrates an example of deblocking filtering performed on a boundary of two adjacent blocks of video data, consistent with the techniques of this disclosure. In the example of FIG. 4, block 404 may be a presently coded, or "current," block of video data that includes a left edge that is to be deblocking filtered, or "deblocked," along with a corresponding right edge of block 402. In this example, block 402 is an adjacent block of video data that is located adjacent to (in this example, to the left of) block 404. For example, block 402 may be a previously coded block of video data that is coded prior to coding block 404. In other examples, a top edge (not shown) of block 404 may be deblocked along with a corresponding bottom edge of an adjacent block of video data (also not shown) that is located on top of block 404.

In some HEVC Test Model versions (e.g., version 4, or "HM4"), an eight-sample edge may be deblocked by a particular deblocking filter. As illustrated in FIG. 4, a deblocking edge area of blocks 402 and 404 includes four lines of pixel values $q0_i$-$q3_i$ parallel to edge 400 in block 404, and four lines of pixel values $p0_i$-$p3_i$ parallel to edge 400 in block 402, where "i" indicates the line of pixels perpendicular to edge 400. Each of the parallel lines of pixel values includes eight pixel values, e.g., $q0_0$-$q0_7$. In the case of a horizontal edge (not shown), e.g., a top edge of the current block, the naming and numbering may be identical to that of the vertical edge (i.e., edge 400) illustrated in FIG. 4. Additionally, the pixel values p or q may be either pre-deblocking filtered values (i.e., reconstructed pixel values) or deblocking filtered values.

In some versions of HM, (e.g., HM4), the deblocking filter, e.g., deblocking filter 64 of video encoder 20 or deblocking filter 94 of video decoder 30, may filter certain TU and PU edges of a block based on a result from a boundary strength computation and deblocking decisions. The deblocking decisions may include whether the deblocking filter is on or off, whether the deblocking filter is weak or strong, and the strength of the weak filter for a given block. The boundary strength computation, which is described in greater detail below with reference to FIG. 6, and the deblocking decisions are dependent on threshold values $t_c$ and β.

In some versions of HM, the threshold values $t_c$ and β of the deblocking filter may depend on a parameter Q, which is derived from a QP value and a boundary strength ("Bs") for a current block of video data using the following expressions:

If Bs>2, then TcOffset=2

If Bs≤2, then TcOffset=0

For $t_c$: Q=Clip3(0,MAX_QP+4, QP+TcOffset);
MAX_QP=51

For β: Q=Clip3(0, MAX_QP, QP)

Clip3(th1, th2, value)=min(th1, max (th2, value))

The threshold values $t_c$ and β may be stored in a table that is accessible based on the parameter Q derived from the QP value of the current block, as described above.

A first deblocking decision is whether the deblocking filtering is on or off for edge 400 of block 404. To make this "on/off" decision, a video coding device, e.g., video encoder 20 and/or video decoder 30, computes a level of activity, $d_1$, across edge 400 for pixel values in a third line (i=2) perpendicular to edge 400, i.e., line 406. The video coding device also computes a level of activity, d2, across edge 400 for pixel values in a sixth line (i=5) perpendicular to edge 400, i.e., line 408. These two activity measurements provide an indication of the activity in the neighborhood of edge 400.

The activity measurements are then summed and compared to the threshold value β. If the summed activity measurements are less than the threshold value β, the deblocking filter is on and applied to the eight-sample deblocking edge area. In this manner, if the activity across edge 400 is high, the deblocking filter is not necessary, because discontinuity across edge 400 will not be visible. If the activity across edge 400 is low, however, the deblocking filter should be applied to smooth the discontinuity between blocks 402 and 404 at edge 400. The computations may be performed according to the following expressions:

$d_1 = |p2_2 - 2 \cdot p1_2 + p0_2| + |q2_2 - 2 \cdot q1_2 + q0_2|$ $d_2 = |p2_5 - 2 \cdot p1_5 + p0_5| + |q2_5 - 2 \cdot q1_5 + q0_5|$ $d = d_1 + d_2 < \beta$ A second deblocking decision includes a determination whether the deblocking filter is a strong filter or a weak filter. The decision whether the deblocking filter is strong or weak may include three distinct determinations, including a texture/activity determination, a gradient determination, and a discontinuity determination across edge 400. In some versions of HM (e.g., HM4), each of the three determinations must be performed for each line (i=0, . . . , 7) of pixel values perpendicular to edge 400. The three determinations may be performed according to the following expressions:

$d < (\beta >> 2);$ $(|p3_i - p0_i| + |q0_i - q3_i|) < (\beta >> 3);$ and $|p0_i - q0_i| < ((5 \cdot t_c + 1) >> 1).$ A third deblocking decision may include, when the deblocking filter is a weak filter, deciding the strength of the weak filter. In some versions of HM (e.g., HM4), a weak filter applied to edge 400 of block 404 may correct either one or two samples on each side of edge 400. In some cases, the weak filter may be applied asymmetrically to correct only one sample on one side of edge 400 and correct two samples on the other side of edge 400.

In some versions of HM (e.g., HM4), the weak filter corrects all the p0 and q0 samples to the right and left of edge 400 based on a weak filter strength computation according to the following equations.

$\Delta = (9 * (q0 - p0) - 3 * (q1 - p1) + 8) / 16$ $\Delta = \text{Clip}(-t_c, t_c, \Delta);$ $t_c$ is a threshold value that depends on the QP value $p0' = p0 + \Delta$ $q0' = q0 - \Delta$ The weak filter optionally corrects all the p1 samples in the second line parallel to edge 400 in adjacent block 104 according to the following equations.

$\Delta p = \text{Clip}(-t_c/2, t_c/2, (((p2 + p0 + 1)/2) - p1 + \Delta)/2)$ $p1' = p1 + \Delta p;$ deblocking of p1 depends on decision conditions Similarly, the weak filter optionally corrects all the q1 samples in the second line parallel to edge 400 in current block 404 according to the following equations.

$\Delta q = \text{Clip}(-t_c/2, t_c/2, (((q2 + q0 + 1)/2) - q1 - \Delta)/2)$ $q1' = q1 + \Delta q;$ deblocking of q1 depends on decision conditions The pixel values p or q may be either pre-deblocking filtered values (i.e., reconstructed pixel values) or deblocking filtered values. The pixel values p' and q' represent the resulting pixel values after performing deblocking filtering on pixel values p and q, respectively. More specifically, the values q0 and q1 indicate pixels values in first and second lines parallel to the edge in current block 404. The values p0 and p1 indicate pixel values in the first and second lines parallel to the edge in adjacent block 402. The equations q0-p0 and q1-p1 indicate step discontinuities between the pixel values across edge 400.

Figure 5:
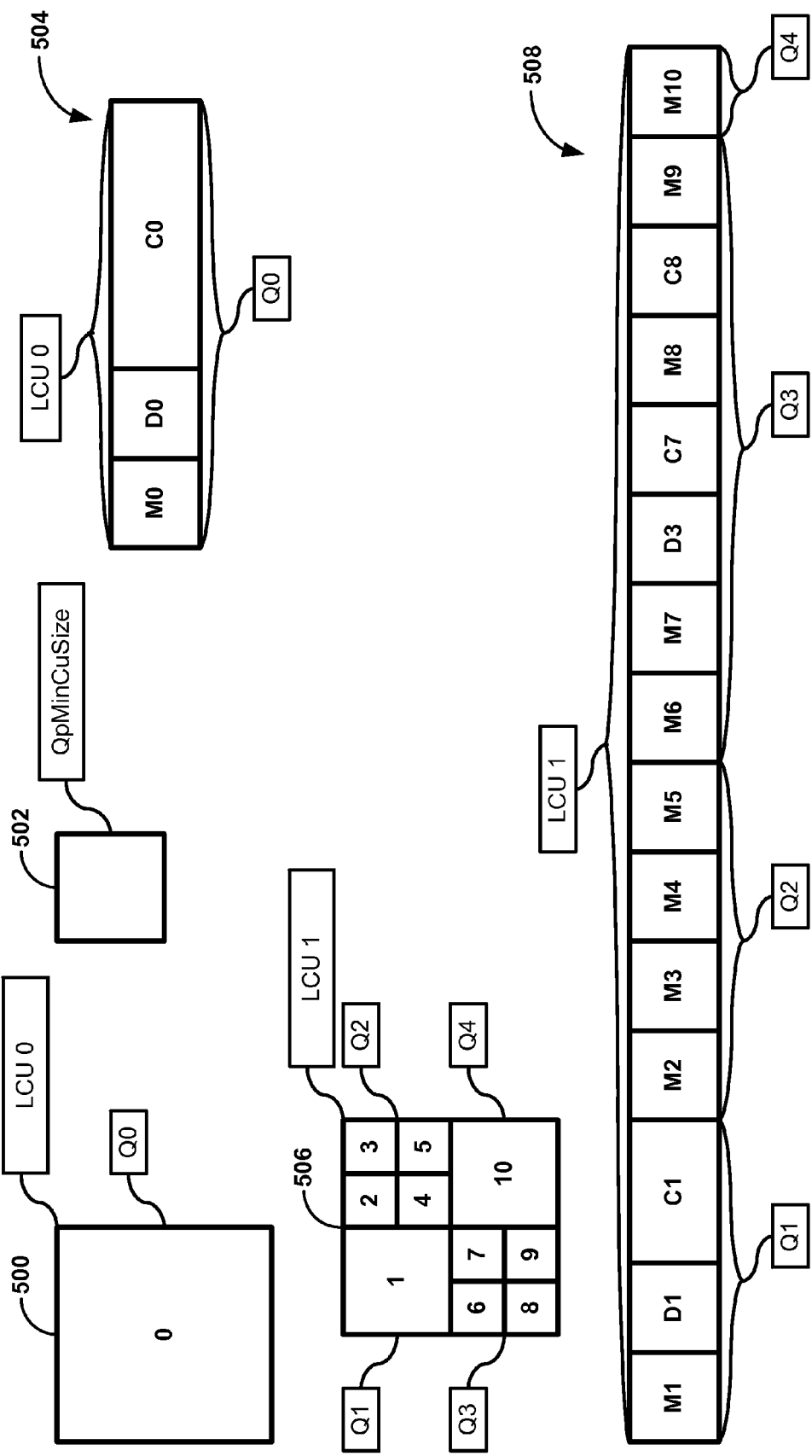
FIG. 5 is a conceptual diagram that illustrates an example of signaling a delta QP value for each of one or more blocks of video data, consistent with the techniques of this disclosure.

FIG. 5 is a conceptual diagram that illustrates an example of signaling a dQP value for each of one or more blocks of video data, consistent with the techniques of this disclosure. Some draft versions of HEVC (e.g., WD6) support LCU-level and sub-LCU-level dQP techniques. For example, some sub-LCU-level dQP methods allow dQP signaling for blocks of video data, i.e., CUs, that are smaller than an LCU size. The purpose of this is to allow a finer granularity rate and visual quality control. According to some techniques, a "dQpMinCuSize" parameter may be defined as a minimum CU quantization group size that can signal a dQP. For blocks that are smaller than the minimum CU quantization group size, all leaf CUs, i.e., blocks of video data, within a quantization group of the minimum CU size may share a same dQP value. Alternatively, according to other techniques, for blocks that are smaller than the minimum CU quantization group size, only some of the leaf CUs or blocks of video data within a quantization group of the minimum CU size may share a same dQP value. For example, only leaf CUs or blocks of video data starting with a first leaf CU or block of video data for which a dQP value is first signaled for the quantization group may share this dQP value. In any case, for blocks that are greater than or equal to the minimum CU quantization group size, a dQP value may be signaled for the leaf CU, i.e., block of video data, of the LCU quadtree. A dQP value may be signaled only when at least one non-zero coefficient exists in the block, i.e., the syntax element coded block flag ("CBF") for the block is equal to true, or "1." Video decoder 30 may add the signaled dQP value for the block to a predicted QP value from a neighboring block of video data to produce the QP value for the current block. The neighboring block may be a neighboring block of video data located to the left of the current block, or the closest previous block of video data to the current block in a coding order.

As shown in FIG. 5, "LCU 0" 500 includes a single block of video data, i.e., "block 0," with a size that is larger than a minimum CU quantization group size 502, which may be indicated using syntax element "QpMinCuSize." As also shown in FIG. 5, LCU 0 500 is not split into any leaf CUs, such that a quantization group "Q0" associated with LCU 0 500 includes only block 0. In the example of FIG. 5, block 0 includes at least one non-zero coefficient. In this example, block 0 may be signaled as a bitstream 504 for LCU 0 500. Also in this example, bitstream 504 includes coding mode ("M0"), dQP value ("D0"), and coefficients ("C0") components for block 0.

As further illustrated in FIG. 5, "LCU 1" 506 is split into multiple blocks of video data, or CUs, according to an LCU quadtree. For example, "block 1" and "block 10" of LCU 1 506 each have a size that is equal to minimum CU quantization group size 502. "Blocks 2-9," on the other hand, each have a size that is smaller than minimum CU quantization group size 502. Generally, all leaf CUs, i.e., blocks of video data, within a minimum CU quantization group size may share same QP and dQP values. For example, as shown in FIG. 5, quantization group "Q1" includes only block 1 and quantization group "Q4" includes only block 10. Quantization group "Q3," however, includes blocks 2-5, and, as a result, each of blocks 2-5 may have a same QP value. Similarly, quantization group "Q3" includes blocks 6-9, and, as a result, each of blocks 6-9 may have a same QP value.

As also shown in FIG. 5, block 1 includes at least one non-zero coefficient and may be signaled as a portion of a bitstream 508 for LCU 1 506 that corresponds to Q1 and that includes coding mode ("M1"), dQP value ("D1"), and coefficients ("C1") components for block 1. In the example of FIG. 5, block 10 is in the "skip-mode" or includes all zero-valued coefficients, and may be signaled as a portion of bitstream 508 for LCU 1 506 that corresponds to Q4 and that includes only a coding mode ("M10") component for block 10. In the same example, each of blocks 2-5 in quantization group Q2 are in the skip-mode or include all zero-valued coefficients, and may be signaled as a portion of bitstream 508 for LCU 1 506 that corresponds to Q2 and that includes only coding mode ("M2-M5") components for blocks 2-5. In this example, each of blocks 6 and 9 in quantization group Q3 are in the skip-mode or include all zero-valued coefficients, and each of blocks 7 and 8 in quantization group Q3 include at least one non-zero coefficient. Blocks 6-9 may be signaled as a portion of bitstream 508 for LCU 1 506 that corresponds to Q3 and that includes only the coding mode ("M6 and M9") components for blocks 6 and 9, and includes coding mode ("M7 and M8"), dQP value ("D3"), and coefficients ("C7 and C8") components for blocks 7 and 8.

Figure 6:
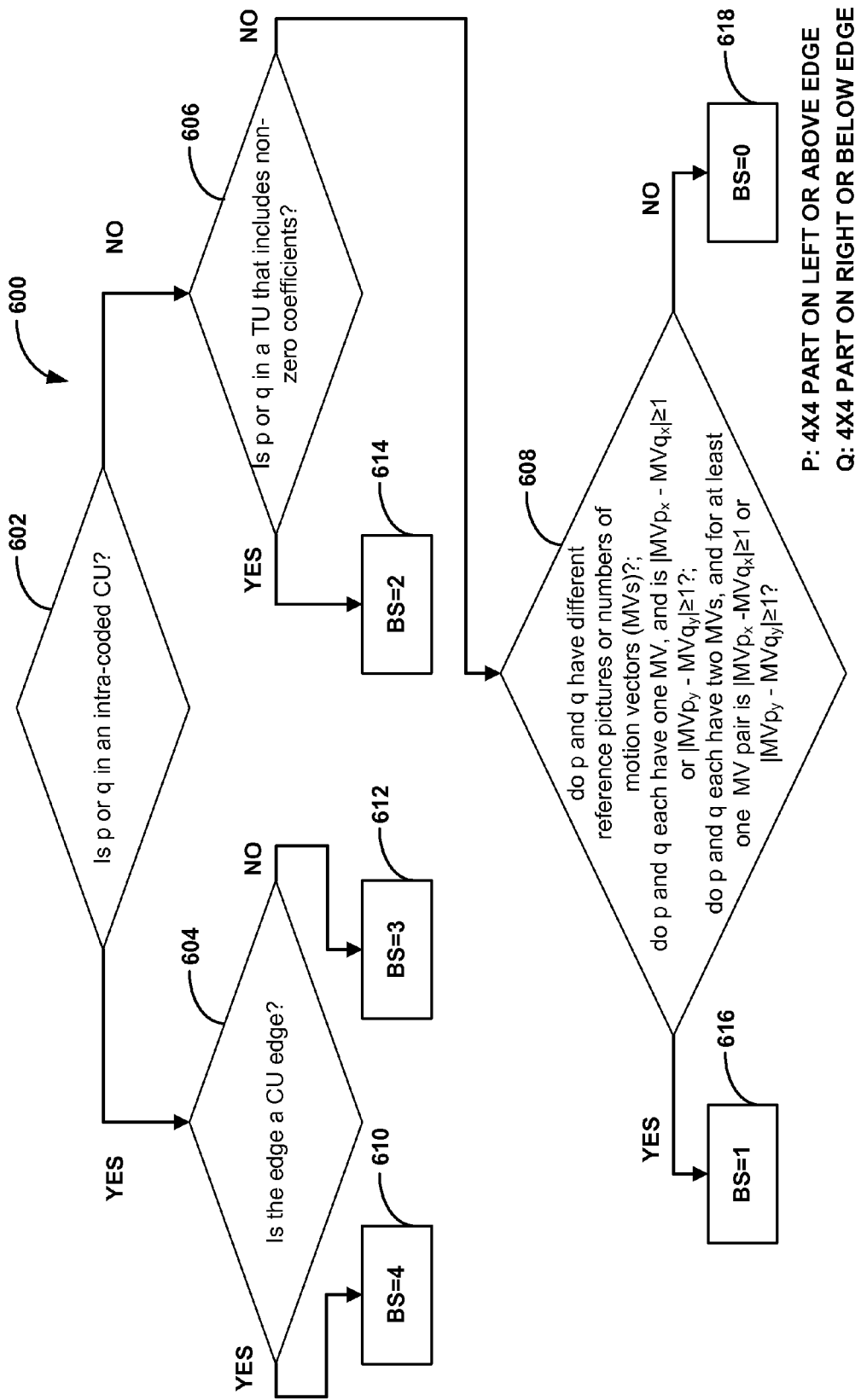
FIG. 6 is a flowchart that illustrates an example method of computing a boundary strength value for a deblocking filter, consistent with the techniques of this disclosure.

FIG. 6 is a flowchart that illustrates an example method of computing a boundary strength value for a deblocking filter, consistent with the techniques of this disclosure. As illustrated in FIG. 6, a boundary strength computation 600 may be based on a coding mode (e.g., an "intra-" or "inter-" coding mode) of a current block of video data (e.g., block 404 of FIG. 4) and an adjacent block of video data (e.g., block 402 of FIG. 4), and whether pixel values in a deblocking edge area (i.e., an area of the blocks along a shared edge that is being deblocking filtered, or "deblocked." e.g., edge 400 of FIG. 4,) includes non-zero coefficients.

More specifically, performing the boundary strength computation may include determining whether one of the current block with the edge to be deblocked and the adjacent block is intra-coded (602). When one of the current block and the adjacent block is intra-coded (602; "YES"), a CU edge check operation may be performed to determine whether the edge to be deblocked is an external CU boundary or an internal CU edge (604). If the edge to be deblocked is an external CU boundary (604; "YES"), the boundary strength ("Bs") value may be set to be equal to "4" (610), and if the edge is an internal CU edge (604; "NO"), the Bs value may be set to be equal to "3" (612). In either case, the Bs value may be greater than "2," such that a syntax element "TcOffset" equal to "2" may be applied to a corresponding QP value (i.e., the QP value for the current block) when identifying a threshold value "t" for the deblocking filter.

When the current block and the adjacent block are inter-coded (602; "NO"), a non-zero coefficient check may be performed to determine whether the samples in the deblocking edge area around the edge to be deblocked include non-zero coefficients (606). In the event the samples include non-zero coefficients (606; "YES"), the Bs value may be set to equal "2" (614). In the event the samples do not include non-zero coefficients (606; "NO"), however, additional checks may be performed to determine any differences between the samples in the current block and the adjacent block (608). If the samples in the current block and the adjacent block have some differences (608; "YES"), the Bs value may be set to equal "1" (616). If, however, the samples in the current block and the adjacent block have little to no differences (608; "NO"), the Bs value may be set to equal "0" (618). When the Bs value is equal to "0," the deblocking filter may be turned off and not applied to the edge to be deblocked of the current block.

Figure 7A:
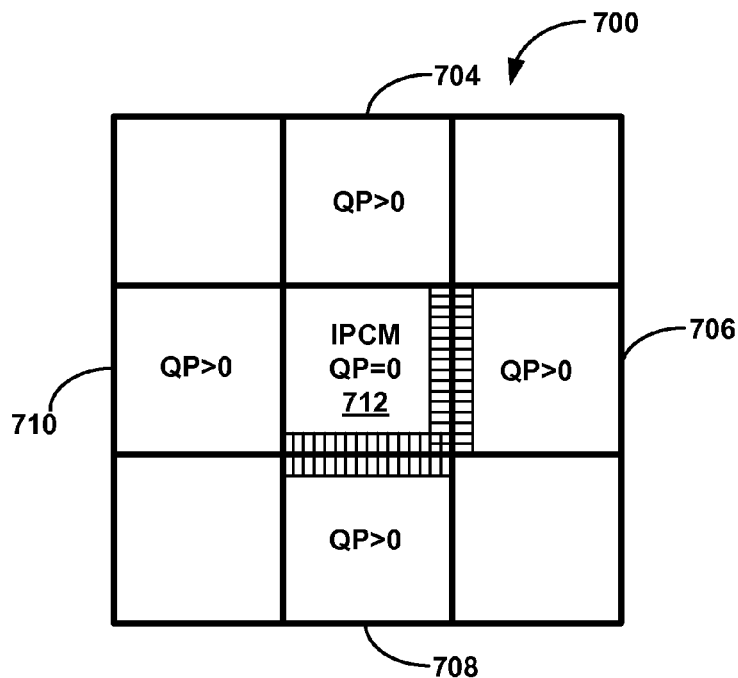
FIGS. 7A-7B are conceptual diagrams that illustrate examples of IPCM coding mode deblocking, consistent with the techniques of this disclosure.
Figure 7B:
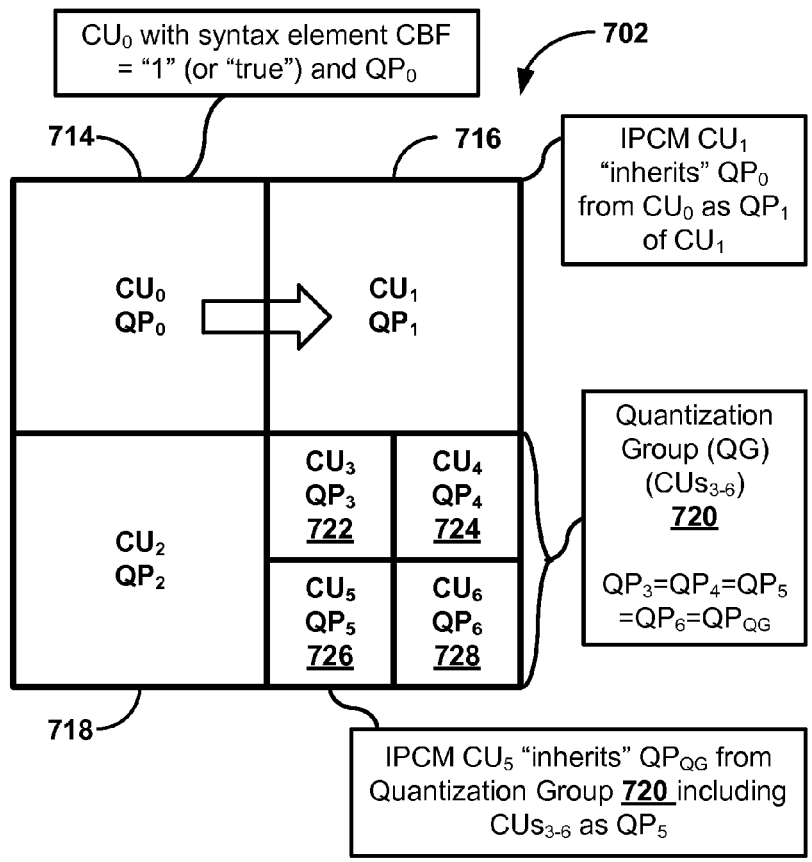

FIGS. 7A-7B are conceptual diagrams that illustrate examples of IPCM coding mode deblocking, consistent with the techniques of this disclosure. FIG. 7A illustrates deblocking filtering that is performed on a current block of video data 712 coded using the IPCM coding mode (i.e., for which "QP=0"), as explained above with reference to FIG. 1. As shown in FIG. 7A, block 712 is deblocked on the right and bottom edges shared with lossy (i.e., for which "QP>0") blocks 706 and 708, respectively. As also shown in FIG. 7A, block 712 is not deblocked on the left and top edges shared with lossy (i.e., for which "QP>0") blocks 710 and 704, respectively. As previously explained, block 712 is deblocked in the manner described above because a zero-valued QP value is associated with block 712, consistent with various draft versions of HEVC for IPCM coded blocks.

FIG. 7B, in turn, illustrates an exemplary QP inheritance technique used to assign a non-zero QP value for an IPCM block to implement the IPCM intra-coding mode deblocking techniques of this disclosure. The QP inheritance technique described herein may operate in a somewhat similar manner as the dQP method described above with reference to FIG. 5.

According to the disclosed techniques, when the pcm_loop_filter_disable_flag is equal to false, or "0," the loop filtering processes are enabled and should be applied to a current IPCM block. In order to apply the deblocking filter, the disclosed techniques include assigning a non-zero QP value to the IPCM block based on a predicted QP value. Video decoder 30, for example, may then apply a deblocking filter to samples of the current IPCM block based on the assigned non-zero QP value for the IPCM block.

As one example, video decoder 30 may implicitly assign the non-zero QP value to the IPCM block based on a known predicted QP value. The predicted QP value may be a QP value for a quantization group that includes the IPCM block, or for a neighboring block of video data located near the IPCM block. In the example of FIG. 7B, when a current IPCM block 716 has a size that is greater than or equal to a minimum CU quantization group size (e.g., a size of quantization group 720 also shown in FIG. 7B), video decoder 30 may set the assigned non-zero QP value ("$QP_1$") for IPCM block 716 equal to a predicted QP value ("$QP_0$") from a neighboring block 714, as shown by the arrow in FIG. 7B. In other words. IPCM block, or $CU_1$ 716 may "inherit" $QP_0$ from neighboring block, or $CU_0$ 714 as $QP_1$ of IPCM block, or $CU_1$ 716. As illustrated in FIG. 7B, neighboring block 714 may be a block of video data located to the left of IPCM block 716. As also shown, neighboring block 714 may be a CU ("$CU_0$") with $QP_0$, as previously described, and with a CBF equal to true, or "1," indicating that neighboring block 714 includes non-zero coefficients. In another example, neighboring block 714 may be the closest previous block to IPCM block 716 in a coding order. In still another example, an average QP may be computed based on multiple neighboring blocks of video data, such as the blocks on the left (e.g., neighboring block 714, or another block) and on top (not shown) of IPCM block 716, and used as the predicted QP value to assign the non-zero QP value for IPCM block 716.

Also in the example of FIG. 7B, alternatively, when a current IPCM block 726 has a size that is smaller than a minimum CU quantization group size (e.g., again, a size of quantization group 720), video decoder 30 may set the assigned non-zero QP value ("$QP_5$") for IPCM block 726 equal to a QP value ("$QP_{QG}$") for quantization group 720 that includes IPCM block 726. As illustrated in FIG. 7B, quantization group 720 includes four blocks, i.e., blocks 722, 724, 726, and 728, or $CUs_{3-6}$, respectively, that are each smaller than the minimum CU quantization group size, and that all have the same QP value (i.e., $QP_3=QP_4=Qp_5=QP_6=QP_{QG}$). In other words. IPCM block, or $CU_5$ 726 may "inherit" $QP_{QG}$ from quantization group 720 including blocks 722, 724, 726, and 728, or $CUs_{3-6}$, as $QP_5$ of IPCM block, or $CU_5$ 726. As previously described, in other examples, only a subset of $CUs_{3-6}$ may share a common $QP_{QG}$. In these examples, $CU_5$ 726 may inherit this $QP_{QG}$ from a subset of quantization group 720 (i.e., from only some of blocks 722, 724, 726, and 728, or $CUs_{3-6}$), as $QP_5$ of IPCM block, or $CU_5$ 726.

As another example, video encoder 20 may assign the non-zero QP value to the IPCM block based on the predicted QP value, and explicitly signal the QP value to video decoder 30. Video encoder 20 may, for example, signal a dQP value for the IPCM block that represents a difference between the assigned non-zero QP value and the predicted QP value. In this example, video decoder 30 may assign the non-zero QP value to the IPCM block based on the received dQP value for the IPCM block. In this manner, video encoder 20 may signal an exact QP value that was used to encode the samples of the IPCM block. For example, according to the techniques described herein, video encoder 20 may signal a syntax element "cu_qp_delta" to indicate the dQP value for the IPCM block with the IPCM samples in the PU syntax for the IPCM block, as illustrated in Table 2. Table 3, in turn, illustrates the case of IPCM burst mode operation based on WD6, where multiple cu_qp_delta values are signaled consecutively, one for each IPCM block.

TABLE 2

PU syntax additions to signal "cu_qp_delta" for IPCM (based on WD4)

```
prediction_unit( x0, y0 ) {
    if( skip_flag[ x0 ][ y0 ] ) {
        merge_idx[ x0 ][ y0 ]
    } else if( PredMode = = MODE_INTRA ) {
        if( PartMode == PART_2Nx2N &&
            log2CUSize >= Log2MinIPCMCUSize )
            pcm_flag
        if( pcm_flag ) {
            if( !pcm_loop_filter_disable_flag && cu_qp_delta_enabled_flag
                && !IsCuQpDeltaCoded ) {
                cu_qp_delta
                IsCuQpDeltaCoded = 1
            }
            while ( !byte_aligned( ) )
                pcm_alignment_zero_bit
            for( i = 0; i < 1 << ( log2CUSize << 1 ); i++ )
                pcm_sample_luma[ i ]
            for( i = 0; i < ( 1 << ( log2CUSize << 1 ) ) >> 1; i++ )
                pcm_sample_chroma[ i ]
        } else {
...
```

TABLE 3

PU syntax additions to signal "cu_qp_delta" for IPCM burst mode operation (based on WD6)

| | Descriptor |
|---|---|
| `prediction_unit( x0, y0, log2CbSize ) {`<br>`  if( skip_flag[ x0 ][ y0 ]) {`<br>`    if( MaxNumMergeCand > 1 )`<br>`      merge_idx[ x0 ][ y0 ]` | ae(v) |
| `  } else if( PredMode = = MODE_INTRA ) {`<br>`    if( PartMode = = PART_2Nx2N && pcm_enabled_`<br>`flag &&`<br>`      log2CbSize >= Log2MinIPCMCUSize &&`<br>`      log2CbSize <= Log2MaxIPCNCUSize )`<br>`      pcm_flag` | ae(v) |
| `    if( pcm_flag ) {`<br>`      num_subsequent_pcm` | tu(3) |
| `      NumPCMBlock = num_subsequent_pcm + 1`<br>`      if (max_cu_qp_delta_depth > 0 ) &&`<br>`!IsCuQpDeltaCoded ) {`<br>`        for( i = 0; i < NumPCMBlock; i++)`<br>`          cu_qp_delta` | se(v)/ ue(v) |
| `          IsCuQpDeltaCoded = 1`<br>`      }` | |

TABLE 3-continued

PU syntax additions to signal "cu_qp_delta" for IPCM burst mode operation (based on WD6)

| | Descriptor |
|---|---|
| while( !byte_aligned( ) ) | |
|   pcm_alignment_zero-bit | u(v) |
| pcm_sample( x0, y0, log2CbSize ) | |
| } else { .... | |

According to the PU syntax illustrated in Table 2, if a current block of video data is indicated as an IPCM block (i.e., "pcm_flag=true"), video decoder 30 may determine whether a dQP value has been signaled for the IPCM block. In this example, if the loop filter processes are enabled (i.e., "pcm_loop_filter_disable_flag=0"), the dQP method is enabled (i.e., "cu_qp_delta_enabled_flag=1"), and the dQP value is coded for the block (i.e., "IsCuQPDeltaCoded flag=0"), video decoder 30 may receive the syntax element cu_qp_delta to indicate the dQP value for the IPCM block.

In the first example described above, when IPCM block 716 has a size that is greater than or equal to the minimum CU quantization group size, video encoder 20 may signal a dQP value for IPCM block 716 equal to "0." In this manner, video decoder 30 may determine the QP value ("$QP_1$") for IPCM block 716 by adding the signaled dQP value of "0" to the predicted QP value ("$QP_0$") from neighboring block 714 (i.e., "$QP_1=QP_0$"). In another example, video encoder 20 may signal a dQP value for IPCM block 716 that is different from "0," and video decoder 30 may determine the QP value ("$QP_1$") for IPCM block 716 by adding the signaled dQP value to the predicted QP value ("$QP_0$") from neighboring block 714 (i.e., "$QP_1=QP_0+dQP$").

In the second example described above, when IPCM block 726 has a size that is smaller than the minimum CU quantization group size, video encoder 20 may signal a dQP value for IPCM block 726 that is equal to the dQP value for quantization group 720 that includes IPCM block 726. In this manner, video decoder 30 may determine the QP value ("$QP_5$") for IPCM block 726 by adding the signaled dQP value to a predicted QP value ("$QP_2$") from a neighboring block 718 (i.e., "$QP_5=QP_2+dQP$"). Because the dQP value for IPCM block 726 is the same as the dQP value for all of the blocks in quantization group 720, video decoder 30 may determine the QP value ("$QP_5$") for IPCM block 726 such that the QP value is equal to a QP value for the quantization group (i.e., $QP_3=QP_4=QP_5=QP_6=QP_{QG}$).

In some cases, video encoder 20 may signal only the dQP value for one of the blocks (e.g., one of blocks 722, 724, 726, 728) in a quantization group (e.g., quantization group 720). The signaled dQP value may be the first coded dQP value for a block that is not an IPCM block, and that includes at least one non-zero coefficient (i.e., for which "CBF=1"). As an example, the syntax element, or flag "IsCuQPDeltaCoded" may be included in the PU syntax to ensure that only the first coded dQP value for a block in a quantization group is signaled to video decoder 30. Video decoder 30 may then set the dQP values for the other blocks in the same quantization group equal to the first coded dQP value.

As described above, some draft versions of HEVC (e.g., WD6) support signaling of a pcm_loop_filter_disable_flag in an SPS to indicate whether loop filter processes are enabled for IPCM blocks. In some cases, it may be desirable to indicate whether the loop filter processes are enabled for IPCM blocks with finer granularity. As such, the techniques of this disclosure further support signaling the pcm_loop_filter_disable_flag in any of a PPS, an APS, a slice header, CU syntax, and PU syntax.

In one example, video encoder 20 may determine whether to apply the loop filter processes, such as deblocking filtering, ALF and SAO, based on whether the current IPCM block includes original samples or reconstructed samples. As discussed above, original samples are distortion free and do not require in-loop filtering, whereas reconstructed samples may include some distortion and may benefit from in-loop filtering. In other examples, video encoder 20 may determine to apply the loop filter processes to IPCM blocks based on other considerations. According to the techniques described herein, video encoder 20 may signal the pcm_loop_filter_disable_flag in the PU syntax, as illustrated in Table 4 below. In particular, Table 4 illustrates the finest granularity at which the loop filter processing may be signaled.

TABLE 4

PU syntax additions to embed "pcm_loop_filter_disable_flag"

```
prediction_unit( x0, y0 ) {
  if( skip_flag[ x0 ][ y0 ] ) {
    merge_idx[ x0 ][ y0 ]
  } else if( PredMode = = MODE_INTRA ) {
    if( PartMode == PART_2Nx2N &&
      log2CUSize >= Log2MinIPCMCUSize )
      pcm_flag
    if( pcm_flag ) {
      pcm_loop_filter_disable_flag
      while ( !byte_aligned( ) )
        pcm_alignment_zero_bit
      for( i = 0; i < 1 << ( log2CUSize << 1 ); i++ )
        pcm_sample_luma[ i ]
      for( i = 0; i < ( 1 << ( log2CUSize << 1 ) ) >> 1; i++)
        pcm_sample_chroma[ i ]
    } else {
...
```

As another example, as explained above, some draft versions of HEVC (e.g., WD6) also support a lossless coding mode for CUs, or blocks of video data. In some examples, qpprime_y_zero_transquant_bypass_flag signaled in the SPS and equal to "1" may specify that if the parameter "$QP'_Y$" (e.g., where $QP'_Y=QP_Y+QpBdOffset_Y$, with $QpBdOffset_Y=6*bit\_depth\_luma\_minus8$) is equal to "0" for a CU, a lossless coding process shall be applied. As previously described, in lossless coding, the scaling and transform processes and the in-loop filter processes are bypassed. The lossless coding mode is similar to the case of an IPCM block containing original samples, as described above, with the difference being that no prediction method for lossless coding is applied to the IPCM block. If a QP or cu_qp_delta value is signaled for an IPCM block, as described above, the resulting $QP'_Y$ value can be equal to "0," as is the case for the lossless coding mode. If the $QP'_Y$ value is equal to "0" for an IPCM block, the loop filters (e.g., deblocking, SAO, ALF) may also be disabled on the IPCM samples, as is the case for the lossless coding mode. This is equivalent to signaling the pcm_loop_filter_disable_flag equal to true, or "." Therefore, the signaling of the pcm_loop_filter_disable_flag may be omitted if the QP value of the IPCM block is used to control the loop filter behavior: $QP'_Y$ equal to "0" is equivalent to pcm_loop_filter_disable_flag being equal to true, or "," while $QP'_Y$ greater than "0" is equivalent to pcm_loop_filter_disable_flag equal to false, or "0." The deblocking filter may compute an average or a maximum of the QP values of the blocks, with at least one block losslessly coded or an IPCM block.

FIGS. 8A-8B are conceptual diagrams that illustrate examples of lossless coding mode deblocking, consistent with the techniques of this disclosure. As shown in FIG. 8A, included within a plurality of CUs (or blocks of video data) 800, a "current" CU 812 that is losslessly coded (i.e., for which "$QP'_Y=0$") may be surrounded by CUs 804-810 that are not losslessly coded (i.e., for each of which "$QP'_Y>0$"). As explained above with reference to FIG. 1, in such cases, a deblocking filter may skip processing of the left and top edges of current CU 812 (e.g., because "$QP'_Y=0$" for CU 812), while performing deblocking filtering on the right and bottom edges of current CU 812 (e.g., by virtue of performing deblocking filtering for CUs 806 and 808, when the respective CUs are coded), as illustrated in FIG. 8A. As already explained, a potential problem associated with the above-described approach is that the deblocking filter may modify lossless samples of current CU 812 along the right and bottom edges, as shown by the "dashed" portions of lossless CU 812 around these edges in FIG. 8A.

As also explained above with reference to FIG. 1, the techniques of this disclosure may include disabling deblocking filtering for losslessly coded CUs, such that the CUs are not deblocked filtered along any of the edges of the CUs, while allowing adjacent "lossy" coded CUs to be deblocked filtered. For example, as shown in FIG. 8B, included within another plurality of CUs (or blocks of video data) 802, another "current" CU 822 that is losslessly coded (i.e., for which "$QP'_Y=0$") may be surrounded by CUs 814-820 that are not losslessly coded (i.e., for each of which "$QP'_Y>0$"). In such cases, a deblocking filter may skip processing of each of the left, top, right, and bottom edges of current CU 822, while allowing deblocking filtering of the corresponding edges of CUs 814-820, as shown in FIG. 8B. Additionally, as also explained above with reference to FIG. 1, the disclosed techniques may further include assigning a non-zero QP value to CU 822 for purposes of performing the deblocking filtering of the corresponding edges of CUs 814-820.

Figure 9:
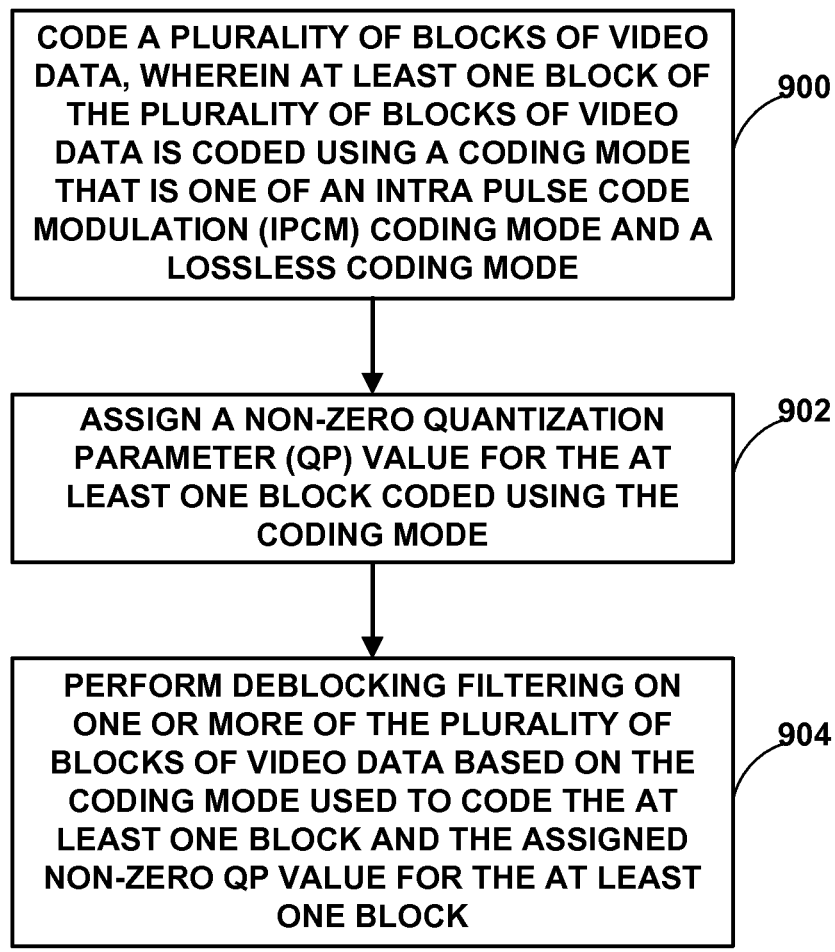
FIGS. 9-11 are flowcharts that illustrate examples methods of IPCM and lossless coding mode deblocking, consistent with the techniques of this disclosure.
Figure 10:
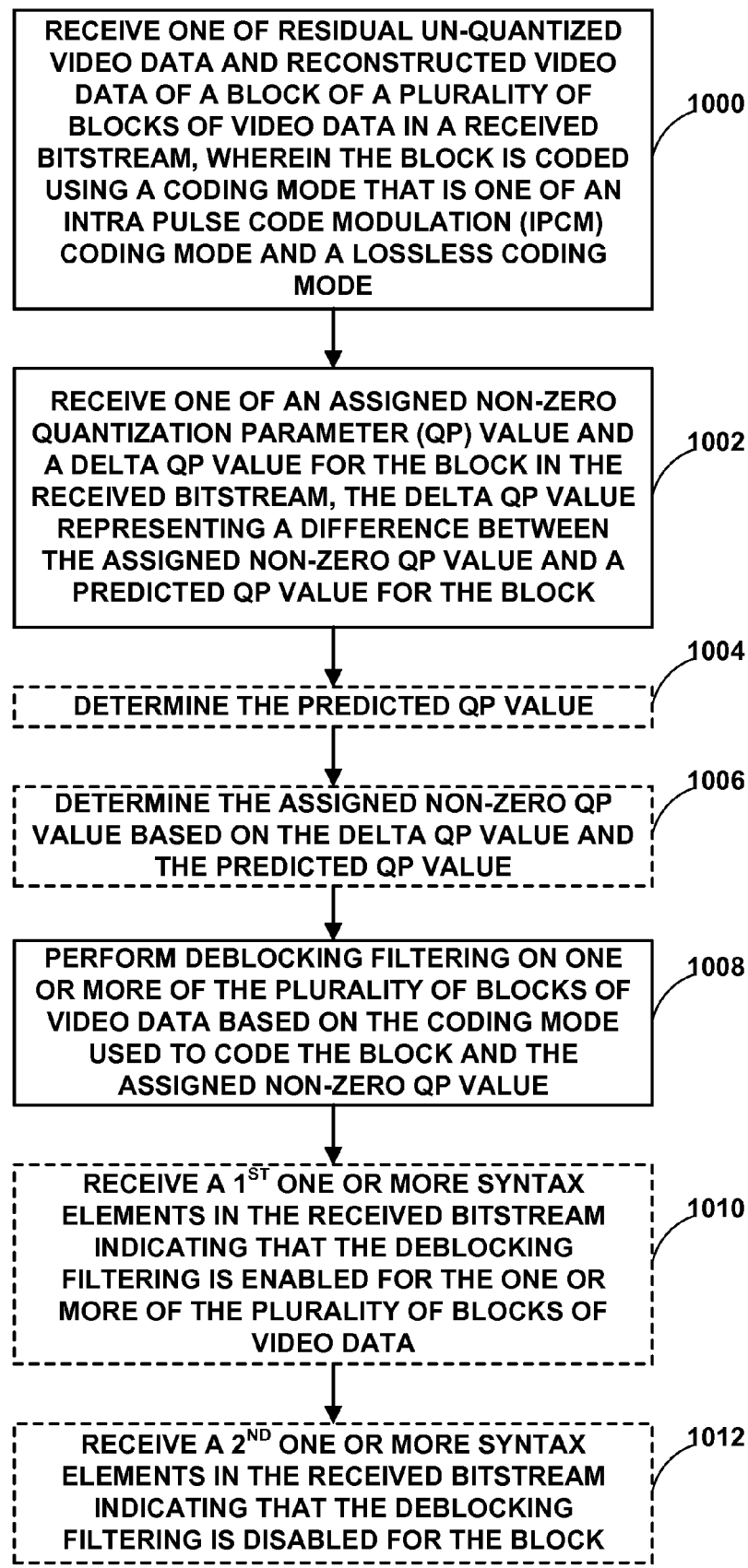
Figure 11:
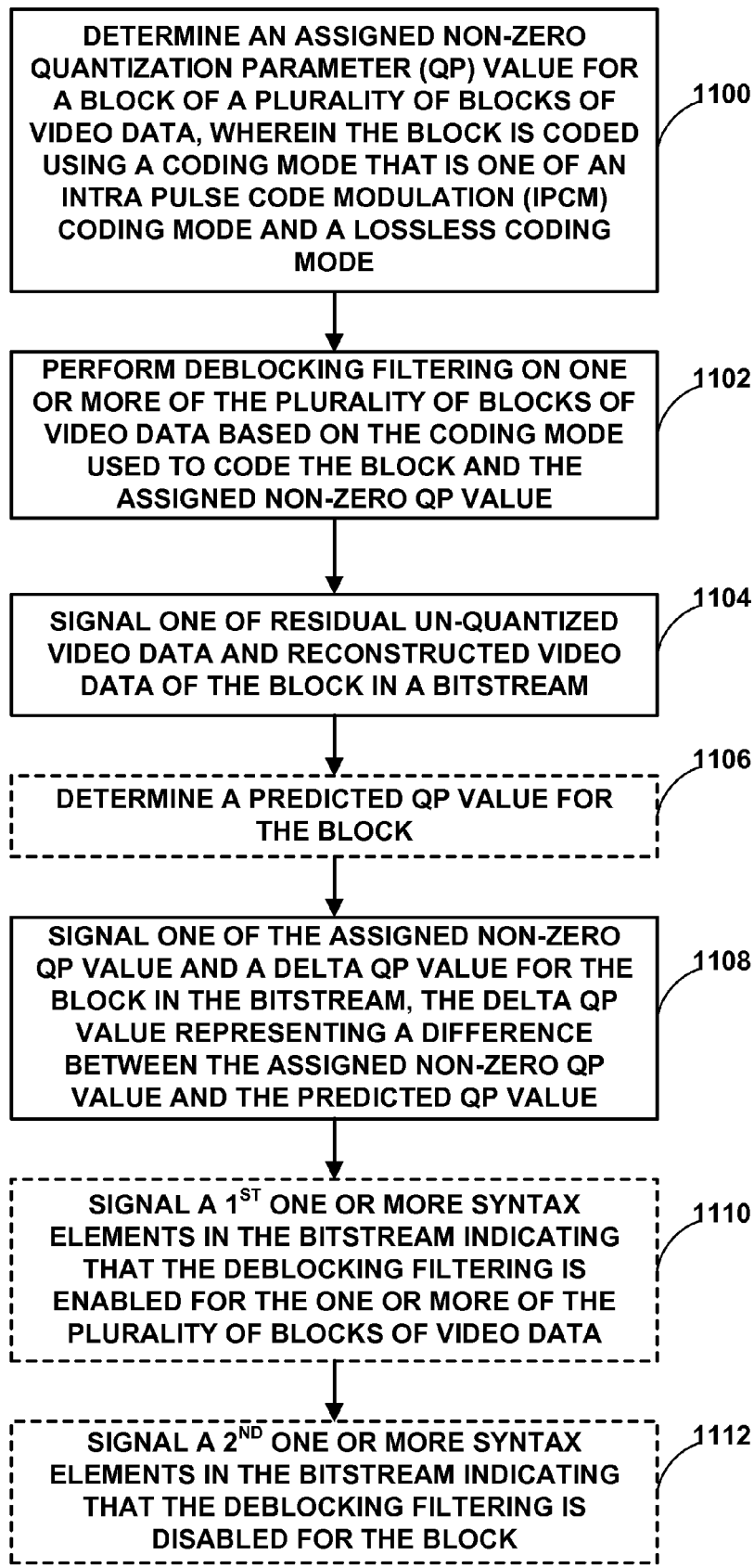

FIGS. 9-11 are flowcharts that illustrate example methods of IPCM and lossless coding mode deblocking, consistent with the techniques of this disclosure. The techniques of FIGS. 9-11 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIGS. 9-11 are described with respect to video encoder 20 (FIGS. 1 and 2) and/or video decoder 30 (FIGS. 1 and 3), although it should be understood that other devices may be configured to perform similar techniques. Moreover, the steps illustrated in FIGS. 9-11 may be performed in a different order or in parallel, and additional steps may be added and certain steps omitted, without departing from the techniques of this disclosure.

Specifically, FIG. 9 illustrates an example method of IPCM coding mode and lossless coding mode deblocking, or "deblocking filtering," in the context of coding (i.e., encoding and/or decoding), generally. Additionally, FIGS. 10 and 11 illustrate example methods of IPCM coding mode and lossless coding mode deblocking in the context of decoding and encoding, respectively.

As one example, video encoder 20 and/or video decoder 30 may code (i.e., encode and/or decode) one or more blocks of video data during a video coding process, as previously described. For example, the one or more blocks may be one or more PUs, TUs, or CUs, as also previously described. In this example, initially, video encoder 20 and/or video decoder 30 may code a plurality of blocks of video data, wherein at least one block of the plurality of blocks of video data is coded using a coding mode that is one of an IPCM coding mode and a lossless coding mode (900). As previously described, the at least one block coded using the IPCM coding mode may correspond to a block of reconstructed video data. For example, the block of reconstructed video data may be generated, e.g., by video encoder 20, by performing the prediction, summation, transformation, and quantization steps described above with reference to FIGS. 1 and 2 using a block of original video data. By performing the above-described steps using the block of original video data, video encoder 20 may generate a block of transformed and quantized residual coefficients. Subsequently, video encoder 20 may perform inverse quantization, inverse transformation, prediction, and summation using the block of transformed and quantized residual coefficients, as also described above, to generate the block of reconstructed video data. Alternatively, as also previously described, the at least one block coded using the lossless coding mode may correspond to a block of residual (e.g., generated using prediction) un-quantized video data, or original video data.

Video encoder 20 and/or video decoder 30 may further assign a non-zero QP value for the at least one block coded using the coding mode (902). For example, as will be described in greater detail below, video encoder 20 and/or video decoder 30 may assign the non-zero QP value for the at least one block using any of a variety of methods. Such methods may include determining the assigned non-zero QP value based on one or more of (1) a signaled QP value for the at least one block (e.g., that indicates the assigned non-zero QP value directly), (2) a predicted QP value for the at least one block (e.g., a QP value of each of one or more neighboring blocks of the at least one block), and (3) a signaled dQP value for the at least one block (e.g., that represents a difference between the assigned non-zero QP value and the predicted QP value).

Video encoder 20 and/or video decoder 30 may still further perform deblocking filtering on one or more of the plurality of blocks of video data based on the coding mode used to code the at least one block and the assigned non-zero QP value for the at least one block (904). For example, as also will be described in greater detail below, video encoder 20 and/or video decoder 30 may perform the deblocking filtering on the at least one block itself, or one or more adjacent blocks of the plurality of blocks of video data that are located adjacent to the at least one block. In this example, the one or more adjacent blocks may be coded using a lossy coding mode.

In particular, in some examples, to perform the deblocking filtering on the one or more of the plurality of blocks of video data based on the coding mode used to code the at least one block and the assigned non-zero QP value, video encoder 20 and/or video decoder 30 may perform the following steps. As one example, in instances where the coding mode used to code the at least one block is the IPCM coding mode, video encoder 20 and/or video decoder 30 may perform the deblocking filtering on the at least one block based on the assigned non-zero QP value. As will be described in greater detail below, video encoder 20 and/or video decoder 30 may also perform the deblocking filtering on one or more other blocks of the plurality of blocks of video data based on the assigned non-zero QP value. As another example, in instances where the coding mode used to code the at least one block is the lossless coding mode, video encoder 20 and/or video decoder 30 may perform the deblocking filtering on one or more adjacent blocks of the plurality of blocks of video data based on the assigned non-zero QP value, while avoiding performing the deblocking filtering on the at least one block itself. In this example, each of the one or more adjacent blocks may be located adjacent to the at least one block and coded using a lossy coding mode. For example, each of the one or more adjacent blocks may be a block of quantized and transformed residual coefficients generated by performing the prediction, summation, transformation, and quantization steps described above with reference to FIGS. 1 and 2 using a block of original video data.

In the above-described examples, to perform the deblocking filtering on each of the at least one block and the adjacent block based on the assigned non-zero QP value, video encoder 20 and/or video decoder 30 may select a filter for the deblocking filtering based on the assigned non-zero QP value. For example, video encoder 20 and/or video decoder 30 may be configured to select the filter, using the assigned non-zero QP value, such that the filter includes one or more filtering parameters or properties that define the manner in which the deblocking filtering, using the filter, is performed. In other examples, to perform the deblocking filtering on each of the at least one block and the adjacent block based on the assigned non-zero QP value, video encoder 20 and/or video decoder 30 may be configured to determine a filter strength for the deblocking filtering based on the assigned non-zero QP value, as described above with reference to deblocking decisions.

As one example, in instances where the at least one block is coded using the IPCM coding mode, video encoder 20 and/or video decoder 30 may perform the deblocking filtering on the at least one block, as well as on one or more adjacent blocks of the plurality of blocks of video data. In this example, each of the adjacent blocks may be located adjacent to the at least one block and coded using a lossy coding mode. For example, each of the adjacent blocks may be a block of quantized and transformed residual coefficients generated by performing the prediction, summation, transformation, and quantization steps described above with reference to FIGS. 1 and 2 using a block of original video data.

In this example, video encoder 20 and/or video decoder 30 may perform the deblocking filtering on one or more of the boundaries shared by the at least one block and the adjacent blocks. In particular, to perform the deblocking filtering on a given boundary shared by the at least one block and a particular one of the adjacent blocks, video encoder 20 and/or video decoder 30 may determine the filter strength using an average of the assigned non-zero QP value for the at least one block and a QP value for the adjacent block. As such, according to the techniques of this disclosure, video encoder 20 and/or video decoder 30 may be configured to determine the filter strength using, at least in part, the assigned non-zero QP value, rather than the default "zero-valued" QP value for the at least one block previously described. Subsequently, video encoder 20 and/or video decoder 30 may perform the deblocking filtering on the boundary based on the determined filter strength. In this example, to perform the deblocking filtering on the boundary, video encoder 20 and/or video decoder 30 may filter internal boundary edges of both the at least one block and the adjacent block (e.g., one or more coefficients within each block that are located proximate to the boundary shared by the two blocks). In this manner, assigning the non-zero QP value for the at least one block, and determining the filter strength used to perform the deblocking filtering based, at least in part, on the assigned non-zero QP value, may, in some cases, improve visual quality of the at least one block and the adjacent blocks, compared to other techniques.

As another example, as previously described, in instances where the at least one block is coded using the lossless coding mode, video encoder 20 and/or video decoder 30 may perform the deblocking filtering on the one or more adjacent blocks of the plurality of blocks of video data, while avoiding performing the deblocking filtering on the at least one block itself. In a similar manner as described above, video encoder 20 and/or video decoder 30 may perform the deblocking filtering on one or more of the boundaries shared by the at least one block and the adjacent blocks. For example, to perform the deblocking filtering on a given boundary shared by the at least one block and a particular one of the adjacent blocks, video encoder 20 and/or video decoder 30 may once again determine the filter strength using an average of the assigned non-zero QP value for the at least one block and a QP value for the adjacent block. According to the techniques of this disclosure, video encoder 20 and/or video decoder 30 may once again determine the filter strength using, at least in part, the assigned non-zero QP value. Subsequently, video encoder 20 and/or video decoder 30 may perform the deblocking filtering on the boundary based on the determined filter strength.

In contrast to the above-described example where the at least one block is coded using the IPCM coding mode, however, in this example, to perform the deblocking filtering on the boundary, video encoder 20 and/or video decoder 30 may filter internal boundary edges of the adjacent block only (e.g., one or more coefficients within the adjacent block that are located proximate to the boundary shared by the two blocks). In other words, in this example, the internal boundary edges of the at least one block itself will remain unaffected by the deblocking filtering. In this manner, assigning the non-zero QP value for the at least one block, and determining the filter coefficients for performing the deblocking filtering based, at least in part, on the assigned non-zero QP value, may, in some cases, improve visual quality of the adjacent blocks compared to other techniques.

In some examples, video encoder 20 and/or video decoder 30 may further, prior to performing the deblocking filtering on the one or more of the plurality of blocks of video data based on the coding mode used to code the at least one block and the assigned non-zero QP value, enable the deblocking filtering for the one or more of the plurality of blocks of video data. As one example, video encoder 20 may signal one or more syntax elements (e.g., 1-bit codes, or "flags") in a bitstream, e.g., to be received by video decoder 30, or to be stored within storage device 24. As another example, video decoder 30 may receive the one or more syntax elements in a bitstream, e.g., signaled by video encoder 20 or storage device 24. In either of these examples, the one or more syntax elements may indicate that the deblocking filtering is enabled for the one or more of the plurality of blocks of video data.

In other examples, particularly in instances where the coding mode is the lossless coding mode, video encoder 20 and/or video decoder 30 may disable deblocking filtering for the at least one block. In these examples, to disable the deblocking filtering, video encoder 20 and/or video decoder 30 may avoid performing the deblocking filtering for internal boundary edges of the at least one block. For example, in a similar manner as described above with reference to the one or more syntax elements that indicate that the deblocking filtering is enabled for the one or more of the plurality of blocks of video data, video encoder 20 may signal and/or video decoder 30 may receive one or more syntax elements (e.g., 1-bit codes, or flags) in a bitstream. In this example, however, the one or more syntax elements may indicate that the deblocking filtering is disabled for the at least one block.

In some examples, to assign the non-zero QP value for the at least one block, video encoder 20 and/or video decoder 30 may determine the assigned non-zero QP value based on one or more of the following: (1) a signaled QP value for the at least one block, wherein the signaled QP value indicates the assigned non-zero QP value; (2) a predicted QP value for the at least one block; and (3) a signaled dQP value for the at least one block, wherein the dQP value represents a difference between the assigned non-zero QP value and the predicted QP value.

As one example, in instances where the coding mode used to code the at least one block is the IPCM coding mode, to assign the non-zero QP value for the at least one block, video encoder 20 and/or video decoder 30 may perform the following steps. As one example, when a size of the at least one block is smaller than a minimum coding unit quantization group size, video encoder 20 and/or video decoder 30 may set a group QP value, e.g., at least one group QP value, for a quantization group that includes the at least one block as the assigned non-zero QP value. In this example, the quantization group may also include one or more blocks of video data coded using a lossy coding mode.

As described above, in some examples, each of the blocks of video data included within the quantization group may have a same group QP value. In these examples, video encoder 20 and/or video decoder 30 may set this common group QP value as the assigned non-zero QP value. In other examples, however, only some blocks of the quantization group (e.g., blocks starting from a first block of the quantization group for which the QP value is signaled, for example, as a dQP value) may have a same group QP value. In these examples, video encoder 20 and/or video decoder 30 may set this particular group QP value that is common to only a subset of the blocks of the quantization group as the assigned non-zero QP value. In this manner, when the size of the at least one block is smaller than the minimum coding unit quantization group size, video encoder 20 and/or video decoder 30 may set at least one group QP value for the quantization group that includes the at least one block as the assigned non-zero QP value.

As another example, when the size of the at least one block is greater than or equal to the minimum coding unit quantization group size, video encoder 20 and/or video decoder 30 may set a QP value for a neighboring block of the plurality of blocks of video data as the assigned non-zero QP value. In this example, the neighboring block may be one or more of a block located adjacent to the at least one block and a previously coded block.

In another example, in instances where the coding mode used to code the at least one block is the IPCM coding mode, to assign the non-zero QP value for the at least one block, video encoder 20 and/or video decoder 30 may perform the following steps. For example, when a size of the at least one block is smaller than a minimum coding unit quantization group size, video encoder 20 and/or video decoder 30 may be set a QP value for a neighboring block of the plurality of blocks of video data, as the assigned non-zero QP value. In this example, the neighboring block once again may be one or more of a block located adjacent to the at least one block and a previously coded block.

In other examples, in instances where the coding mode used to code the at least one block is the lossless coding mode, to assign the non-zero QP value for the at least one block, video encoder 20 and/or video decoder 30 may set one of a QP value and a dQP value for a lossy block of the plurality of blocks of video data as the assigned non-zero QP value. In this example, the dQP value may represent a difference between the QP value and a predicted QP value for the lossy block. Also in this example, the lossy block may be a block coded using a lossy coding mode.

In still other examples, in instances where the coding mode used to code the at least one block is the lossless coding mode, instead of determining the assigned non-zero QP value using the above-described techniques, to assign the non-zero QP value for the at least one block, video encoder 20 and/or video decoder 30 may set a constant value as the assigned non-zero QP value.

In this manner, in some examples, video encoder 20 and/or video decoder 30 may code a plurality of blocks of video data, wherein at least one block of the plurality of blocks of video data is coded using an IPCM coding mode, assign a non-zero QP value for the at least one block, and perform deblocking filtering on one or more of the plurality of blocks of video data based on the assigned non-zero QP value for the at least one block.

Alternatively, in other examples, video encoder 20 and/or video decoder 30 may code a plurality of blocks of video data, wherein at least one block of the plurality of blocks of video data is coded using a lossless coding mode that uses prediction, assign a non-zero QP value for the at least one block, and perform deblocking filtering on one or more of the plurality of blocks of video data, other than the at least one block, based on the assigned non-zero QP value for the at least one block. In these examples, video encoder 20 and/or video decoder 30 may further avoid performing deblocking filtering on the at least one block.

As another example, video decoder 30 may receive one of residual un-quantized video data and reconstructed video data of a block of a plurality of blocks of video data in a received bitstream. In this example, the block may be coded using a coding mode that is one of an IPCM coding mode and a lossless coding mode (1000). Also in this example, the lossless coding mode may correspond to a lossless coding mode that uses prediction, as previously described. Video decoder 30 may further receive one of an assigned non-zero QP value and a dQP value for the block in the received bitstream. For example, the dQP value may represent a difference between the assigned non-zero QP value and a predicted QP value for the block (1002).

In some examples, particularly in instances where video decoder 30 receives the a dQP value, video decoder 30 may still further determine the predicted QP value (1004), and determine the assigned non-zero QP value based on the dQP value and the predicted QP value (1006). Video decoder 30 may also perform deblocking filtering on one or more of the plurality of blocks of video data based on the coding mode used to code the block and the assigned non-zero QP value (1008).

In the above-described example, video decoder 30 may further receive a first one or more syntax elements (e.g., one or more single-bit codes, which may be referred to as "flags") in the received bitstream indicating that the deblocking filtering is enabled for the one or more of the plurality of blocks of video data (1010). Also in this example, video decoder 30 may still further receive a second one or more syntax elements (e.g., again, one or more "flags") in the received bitstream indicating that the deblocking filtering is disabled for the block (1012).

As still another example, video encoder 20 may determine an assigned non-zero QP value for a block of a plurality of blocks of video data. In this example, the block may be coded using a coding mode that is one of an IPCM coding mode and a lossless coding mode (1100). Also in this example, the lossless coding mode once again may correspond to a lossless coding mode that uses prediction. Video encoder 20 may further perform deblocking filtering on one or more of the plurality of blocks of video data based on the coding mode used to code the block and the assigned non-zero QP value (1102). Video encoder 20 may still further signal one of residual un-quantized video data and reconstructed video data of the block in a bitstream (1104). In some examples, video encoder 20 also may determine a predicted QP value for the block (1106).

Video encoder 20 may also signal one of the assigned non-zero QP value and a dQP value for the block in the bitstream. In this example, the dQP value may represent a difference between the assigned non-zero QP value and the predicted QP value (1108) described above with reference to step (1106).

In the above-described example, video encoder 20 may further signal a first one or more syntax elements (e.g., one or more "flags") in the bitstream indicating that the deblocking filtering is enabled for the one or more of the plurality of blocks of video data (1110). Also in this example, video encoder 20 may still further signal a second one or more syntax elements (e.g., again, one or more "flags") in bitstream indicating that the deblocking filtering is disabled for the block (1112).

In this manner, the method of each of FIGS. 9-11 represents an example of a method of coding video data comprising coding a plurality of blocks of video data, wherein at least one block of the plurality of blocks of video data is coded using a coding mode that is one of an IPCM coding mode and a lossless coding mode that uses prediction, assigning a non-zero QP value for the at least one block coded using the coding mode, and performing deblocking filtering on one or more of the plurality of blocks of video data based on the coding mode used to code the at least one block and the assigned non-zero QP value for the at least one block.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which may correspond to tangible or non-transitory media, such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient or non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more general purpose microprocessors, DSPs, ASICs, FPGAs, or other equivalent integrated or discrete logic circuitry. Accordingly, the term "processor," as used herein, may refer to any of the foregoing structure or any other structure suitable for implementation of the techniques described in this disclosure. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, modules, or units are described in this disclosure to emphasize functional aspects of devices configured to perform the disclosed techniques, but do not necessarily require realization by different hardware components, modules, or units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data comprising:
    coding a plurality of blocks of the video data, wherein at least one block of the plurality of blocks of video data is coded using a lossless coding mode, wherein coding the at least one block using the lossless coding mode comprises:
        predicting the at least one block to generate a predicted block for the lossless coding mode; and
        coding the at least one block based on the predicted block and an un-quantized residual;
    predicting a non-zero quantization parameter (QP) value, for the at least one block based at least in part on a QP value for a quantization group that includes the at least one block, wherein the quantization group comprises one or more consecutive blocks in a coding order of the plurality of blocks;

assigning the non-zero QP value for the at least one block;
determining whether to perform in-loop filtering of each of the plurality of blocks comprising:
   determining whether to perform deblocking filtering on one or more of the plurality of blocks of video data, other than the at least one block, based on the assigned non-zero QP value for the at least one block; and
   determining to avoid performing deblocking filtering on the at least one block; and
performing in-loop filtering for each of the plurality of blacks based on the respective determinations.

2. The method of claim 1, wherein performing the deblocking filtering on the one or more of the plurality of blocks of video data based on the assigned non-zero QP value comprises:
performing the deblocking filtering on an adjacent block of the plurality of blocks of video data, the adjacent block located adjacent to the at least one block and coded using a lossy coding mode, based on the assigned non-zero QP value.

3. The method of claim 2, wherein performing the deblocking filtering on each of the at least one block and the adjacent block based on the assigned non-zero QP value comprises selecting a filter for the deblocking filtering based on the assigned non-zero QP value.

4. The method of claim 1, wherein performing the deblocking filtering on each of the at least one block and the adjacent block based on the assigned non-zero QP value comprises determining a filter strength for the deblocking filtering based on the assigned non-zero QP value.

5. The method of claim 1, further comprising, prior to performing the deblocking filtering on the one or more of the plurality of blocks of video data based on the assigned non-zero QP value, enabling the deblocking filtering for the one or more of the plurality of blocks of video data.

6. The method of claim 1, further comprising disabling deblocking filtering for the at least one block, including not performing the deblocking filtering for internal boundary edges of the at least one block.

7. The method of claim 1, wherein assigning the non-zero QP value for the at least one block comprises determining the assigned non-zero QP value based on one or more of the following:
   a signaled QP value for the at least one block, wherein the signaled QP value indicates the assigned non-zero QP value;
   a predicted QP value for the at least one block; or
   a signaled delta QP value for the at least one block, wherein the delta QP value represents a difference between the assigned non-zero QP value and the predicted QP value.

8. The method of claim 1, wherein assigning the non-zero QP value for the at least one block comprises setting one of a QP value and a delta QP value for a lossy block of the plurality of blocks of video data as the assigned non-zero QP value, wherein the delta QP value represents a difference between the QP value and a predicted QP value for the lossy block, the lossy block comprising a block coded using a lossy coding mode.

9. The method of claim 1, wherein assigning the non-zero QP value for the at least one block comprises setting a constant value as the assigned non-zero QP value.

10. The method of claim 1, wherein coding comprises decoding, and wherein
decoding the at least one block comprises receiving one of residual un-quantized video data and reconstructed video data of the at least one block in a received bitstream, and
assigning the non-zero QP value for the at least one block comprises one of receiving the assigned non-zero QP value in the received bitstream, and receiving a delta QP value for the at least one block in the received bitstream, the delta QP value representing a difference between the assigned non-zero QP value and a predicted QP value for the at least one block, and determining the assigned non-zero QP value based on the delta QP value and the predicted QP value,
the method further comprising receiving one or more syntax elements in the received bitstream, the one or more syntax elements indicating that the deblocking filtering is enabled for the one or more of the plurality of blocks of video data.

11. The method of claim 10, wherein the one or more syntax elements comprise a first one or more syntax elements, the method further comprising receiving a second one or more syntax elements in the received bitstream, the second one or more syntax elements indicating that the deblocking filtering is disabled for the at least one block.

12. The method of claim 1, wherein coding comprises encoding, and wherein
encoding the at least one block comprises signaling one of residual un-quantized video data and reconstructed video data of the at least one block in a bitstream, and
assigning the non-zero QP value for the at least one block comprises one of signaling the assigned non-zero QP value in the bitstream, and signaling a delta QP value for the at least one block in the bitstream, the delta QP value representing a difference between the assigned non-zero QP value and a predicted QP value for the at least one block,
the method further comprising signaling one or more syntax elements in the bitstream, the one or more syntax elements indicating that the deblocking filtering is enabled for the one or more of the plurality of blocks of video data.

13. The method of claim 12, wherein the one or more syntax elements comprise a first one or more syntax elements, the method further comprising signaling a second one or more syntax elements in the bitstream, the second one or more syntax elements indicating that the deblocking filtering is disabled for the at least one block.

14. An apparatus configured to code video data, the apparatus comprising:
   a video data memory configured to store the video data; and
   a video coder comprising one or more processors configured to:
      code a plurality of blocks of the video data, wherein at least one block of the plurality of blocks of video data is coded using a lossless coding mode, wherein coding the at least one block using the lossless coding mode comprises:
         predict the at least one block to generate a predicted block for the lossless coding mode; and
         code the at least one block based on the predicted block and an un-quantized residual;
      predict a non-zero quantization parameter (QP) value, for the at least one block based at least in part on a QP value for a quantization group that includes the at least one block, wherein the quantization group comprises one or more consecutive blocks in a coding order of the plurality of blocks;
assign the non-zero QP value for the at least one block;
determine whether to perform in-loop filtering of each of the plurality of blocks comprising:
determine whether to perform deblocking filtering on one or more of the plurality of blocks of video data, other than the at least one block, based on the assigned non-zero QP value for the at least one block; and
determine to avoid performing deblocking filtering on the at least one block; and
perform in-loop filtering for each of the plurality of blacks based on the respective determinations.

15. The apparatus of claim 14, wherein to perform the deblocking filtering on the one or more of the plurality of blocks of video data based on the assigned non-zero QP value, the video coder is configured to:
perform the deblocking filtering on an adjacent block of the plurality of blocks of video data, the adjacent block located adjacent to the at least one block and coded using a lossy coding mode, based on the assigned non-zero QP value.

16. The apparatus of claim 15, wherein to perform the deblocking filtering on each of the at least one block and the adjacent block based on the assigned non-zero QP value, the video coder is configured to perform one or more of:
select a filter for the deblocking filtering based on the assigned non-zero QP value; and
determine a filter strength for the deblocking filtering based on the assigned non-zero QP value.

17. The apparatus of claim 14, wherein the video coder is further configured to, prior to performing the deblocking filtering on the one or more of the plurality of blocks of video data based on the assigned non-zero QP value, enable the deblocking filtering for the one or more of the plurality of blocks of video data.

18. The apparatus of claim 14, wherein the video coder is further configured to disable deblocking filtering for the at least one block, including the video coder not performing the deblocking filtering for internal boundary edges of the at least one block.

19. The apparatus of claim 14, wherein to assign the non-zero QP value for the at least one block, the video coder is configured to determine the assigned non-zero QP value based on one or more of the following:
a signaled QP value for the at least one block, wherein the signaled QP value indicates the assigned non-zero QP value;
a predicted QP value for the at least one block; or
a signaled delta QP value for the at least one block, wherein the delta QP value represents a difference between the assigned non-zero QP value and the predicted QP value.

20. The apparatus of claim 14, wherein to assign the non-zero QP value for the at least one block, the video coder is configured to set one of a QP value and a delta QP value for a lossy block of the plurality of blocks of video data as the assigned non-zero QP value, wherein the delta QP value represents a difference between the QP value and a predicted QP value for the lossy block, the lossy block comprising a block coded using a lossy coding mode.

21. The apparatus of claim 14, wherein to assign the non-zero QP value for the at least one block, the video coder is configured to set a constant value as the assigned non-zero QP value.

22. The apparatus of claim 14, wherein to code the plurality of blocks of video data including the at least one block, the video coder is configured to decode the plurality of blocks of video including the at least one block, and wherein
to decode the at least one block, the video coder is configured to receive one of residual un-quantized video data and reconstructed video data of the at least one block in a received bitstream, and
to assign the non-zero QP value for the at least one block, the video coder is configured to perform one of receiving the assigned non-zero QP value in the received bitstream, and receiving a delta QP value for the at least one block in the received bitstream, the delta QP value representing a difference between the assigned non-zero QP value and a predicted QP value for the at least one block, and determining the assigned non-zero QP value based on the delta QP value and the predicted QP value,
wherein the video coder is further configured to receive one or more syntax elements in the received bitstream, the one or more syntax elements indicating that the deblocking filtering is enabled for the one or more of the plurality of blocks of video data.

23. The apparatus of claim 22, wherein the one or more syntax elements comprise a first one or more syntax elements, and wherein the video coder is further configured to receive a second one or more syntax elements in the received bitstream, the second one or more syntax elements indicating that the deblocking filtering is disabled for the at least one block.

24. The apparatus of claim 14, wherein to code the plurality of blocks of video data including the at least one block, the video coder is configured to encode the plurality of blocks of video including the at least one block, and wherein
to encode the at least one block, the video coder is configured to signal one of residual un-quantized video data and reconstructed video data of the at least one block in a bitstream, and
to assign the non-zero QP value for the at least one block, the video coder is configured to perform one of signaling the assigned non-zero QP value in the bitstream, and signaling a delta QP value for the at least one block in the bitstream, the delta QP value representing a difference between the assigned non-zero QP value and a predicted QP value for the at least one block,
wherein the video coder is further configured to signal one or more syntax elements in the bitstream, the one or more syntax elements indicating that the deblocking filtering is enabled for the one or more of the plurality of blocks of video data.

25. The apparatus of claim 24, wherein the one or more syntax elements comprise a first one or more syntax elements, and wherein the video coder is further configured to signal a second one or more syntax elements in the bitstream, the second one or more syntax elements indicating that the deblocking filtering is disabled for the at least one block.

26. The apparatus of claim 14, wherein the apparatus comprises at least one of:
an integrated circuit;
a microprocessor; and
a wireless communication device that includes the video coder.

27. A device configured to code video data, the device comprising:

means for coding a plurality of blocks of the video data, wherein at least one block of the plurality of blocks of video data is coded using a lossless coding mode, wherein the means for coding the at least one block using the lossless coding mode comprises:
  means for predicting the at least one block to generate a predicted block for the lossless coding mode; and means for coding the at least one block based on the predicted block and an un-quantized residual;
means for predicting a non-zero quantization parameter (QP) value, for the at least one block based at least in part on a QP value for a quantization group that includes the at least one block, wherein the quantization group comprises one or more consecutive blocks in a coding order of the plurality of blocks;
means for assigning the non-zero QP value for the at least one block;
means for determining whether to perform in-loop filtering of each of the plurality of blocks comprising:
  means for determining whether to perform deblocking filtering on one or more of the plurality of blocks of video data, other than the at least one block, based on the assigned non-zero QP value for the at least one block; and
  means for determining to avoid performing deblocking filtering on the at least one block; and
means for performing in-loop filtering for each of the plurality of blacks based on the respective determinations.

28. The device of claim 27, wherein the means for performing the deblocking filtering on the one or more of the plurality of blocks of video data based on the assigned non-zero QP value comprises:
  means for performing the deblocking filtering on an adjacent block of the plurality of blocks of video data, the adjacent block located adjacent to the at least one block and coded using a lossy coding mode, based on the assigned non-zero QP value.

29. The device of claim 28, wherein the means for performing the deblocking filtering on each of the at least one block and the adjacent block based on the assigned non-zero QP value comprises one or more of:
  means for selecting a filter for the deblocking filtering based on the assigned non-zero QP value; and
  means for determining a filter strength for the deblocking filtering based on the assigned non-zero QP value.

30. The device of claim 27, wherein the means for assigning the non-zero QP value for the at least one block comprises means for determining the assigned non-zero QP value based on one or more of the following:
  a signaled QP value for the at least one block, wherein the signaled QP value indicates the assigned non-zero QP value;
  a predicted QP value for the at least one block; or
  a signaled delta QP value for the at least one block, wherein the delta QP value represents a difference between the assigned non-zero QP value and the predicted QP value.

31. The device of claim 27, wherein the means for assigning the non-zero QP value for the at least one block comprises means for setting one of a QP value and a delta QP value for a lossy block of the plurality of blocks of video data as the assigned non-zero QP value, wherein the delta QP value represents a difference between the QP value and a predicted QP value for the lossy block, the lossy block comprising a block coded using a lossy coding mode.

32. The device of claim 27, wherein the means for assigning the non-zero QP value for the at least one block comprises means for setting a constant value as the assigned non-zero QP value.

33. The device of claim 27, wherein coding comprises decoding, and wherein
  the means for decoding the at least one block comprises means for receiving one of residual un-quantized video data and reconstructed video data of the at least one block in a received bitstream, and
  the means for assigning the non-zero QP value for the at least one block comprises one of means for receiving the assigned non-zero QP value in the received bitstream, and means for receiving a delta QP value for the at least one block in the received bitstream, the delta QP value representing a difference between the assigned non-zero QP value and a predicted QP value for the at least one block, and determining the assigned non-zero QP value based on the delta QP value and the predicted QP value,
  the device further comprising means for receiving one or more syntax elements in the received bitstream, the one or more syntax elements indicating that the deblocking filtering is enabled for the one or more of the plurality of blocks of video data.

34. The device of claim 27, wherein coding comprises encoding, and wherein
  the means for encoding the at least one block comprises means for signaling one of residual un-quantized video data and reconstructed video data of the at least one block in a bitstream, and
  the means for assigning the non-zero QP value for the at least one block comprises one of means for signaling the assigned non-zero QP value in the bitstream, and means for signaling a delta QP value for the at least one block in the bitstream, the delta QP value representing a difference between the assigned non-zero QP value and a predicted QP value for the at least one block,
  the device further comprising means for signaling one or more syntax elements in the bitstream, the one or more syntax elements indicating that the deblocking filtering is enabled for the one or more of the plurality of blocks of video data.

35. A non-transitory computer-readable storage medium storing instructions that, when executed, cause one or more processors to code video data, wherein the instructions cause the one or more processors to:
  code a plurality of blocks of the video data, wherein at least one block of the plurality of blocks of video data is coded using a lossless coding mode, wherein coding the at least one block using the lossless coding mode comprises:
    predict the at least one block to generate a predicted block for the lossless coding mode; and
    code the at least one block based on the predicted block and an un-quantized residual;
  predict a non-zero quantization parameter (QP) value, for the at least one block based at least in part on a QP value for a quantization group that includes the at least one block, wherein the quantization group comprises one or more consecutive blocks in a coding order of the plurality of blocks;
  assign the non-zero QP value for the at least one block;
  determine whether to perform in-loop filtering of each of the plurality of blocks comprising:
    determine whether to perform deblocking filtering on one or more of the plurality of blocks of video data, other than the at least one block, based on the assigned non-zero QP value for the at least one block; and determine to avoid performing deblocking filtering on the at least one block; and perform in-loop filtering for each of the plurality of blacks based on the respective determinations.

36. The non-transitory computer-readable storage medium of claim 35, wherein the instructions that cause the one or more processors to perform the deblocking filtering on the one or more of the plurality of blocks of video data based on the assigned non-zero QP value comprise instructions that cause the one or more processors to:

perform the deblocking filtering on an adjacent block of the plurality of blocks of video data, the adjacent block located adjacent to the at least one block and coded using a lossy coding mode, based on the assigned non-zero QP value.

37. The non-transitory computer-readable storage medium of claim 36, wherein the instructions that cause the one or more processors to perform the deblocking filtering on each of the at least one block and the adjacent block based on the assigned non-zero QP value comprise instructions that cause the one or more processors to perform one or more of:

select a filter for the deblocking filtering based on the assigned non-zero QP value; and determine a filter strength for the deblocking filtering based on the assigned non-zero QP value.

38. The non-transitory computer-readable storage medium of claim 35, wherein the instructions that cause the one or more processors to assign the non-zero QP value for the at least one block comprise instructions that cause the one or more processors to determine the assigned non-zero QP value based on one or more of the following:

a signaled QP value for the at least one block, wherein the signaled QP value indicates the assigned non-zero QP value;

a predicted QP value for the at least one block; or a signaled delta QP value for the at least one block, wherein the delta QP value represents a difference between the assigned non-zero QP value and the predicted QP value.

39. The non-transitory computer-readable storage medium of claim 35, wherein the instructions that cause the one or more processors to assign the non-zero QP value for the at least one block comprise instructions that cause the one or more processors to set one of a QP value and a delta QP value for a lossy block of the plurality of blocks of video data as the assigned non-zero QP value, wherein the delta QP value represents a difference between the QP value and a predicted QP value for the lossy block, the lossy block comprising a block coded using a lossy coding mode.

40. The non-transitory computer-readable storage medium of claim 35, and wherein the instructions that cause the one or more processors to assign the non-zero QP value for the at least one block comprise instructions that cause the one or more processors to set a constant value as the assigned non-zero QP value.

41. The non-transitory computer-readable storage medium of claim 35, wherein coding comprises decoding, and wherein the instructions that cause the one or more processors to decode the at least one block comprise instructions that cause the one or more processors to receive one of residual un-quantized video data and reconstructed video data of the at least one block in a received bitstream, and the instructions that cause the one or more processors to assign the non-zero QP value for the at least one block comprise one of instructions that cause the one or more processors to receive the assigned non-zero QP value in the received bitstream, and instructions that cause the one or more processors to receive a delta QP value for the at least one block in the received bitstream, the delta QP value representing a difference between the assigned non-zero QP value and a predicted QP value for the at least one block, and determine the assigned non-zero QP value based on the delta QP value and the predicted QP value, the computer-readable storage medium further comprising instructions that cause the one or more processors to receive one or more syntax elements in the received bitstream, the one or more syntax elements indicating that the deblocking filtering is enabled for the one or more of the plurality of blocks of video data.

42. The non-transitory computer-readable storage medium of claim 35, wherein coding comprises encoding, and wherein the instructions that cause the one or more processors to encode the at least one block comprise instructions that cause the one or more processors to signal one of residual un-quantized video data and reconstructed video data of the at least one block in a bitstream, and the instructions that cause the one or more processors to assign the non-zero QP value for the at least one block comprise one of instructions that cause the one or more processors to signal the assigned non-zero QP value in the bitstream, and instructions that cause the one or more processors to signal a delta QP value for the at least one block in the bitstream, the delta QP value representing a difference between the assigned non-zero QP value and a predicted QP value for the at least one block, the computer-readable storage medium further comprising instructions that cause the one or more processors to signal one or more syntax elements in the bitstream, the one or more syntax elements indicating that the deblocking filtering is enabled for the one or more of the plurality of blocks of video data.

* * * * *